(12) United States Patent
Takada et al.

(10) Patent No.: US 8,400,893 B2
(45) Date of Patent: Mar. 19, 2013

(54) STORAGE APPARATUS AND ESTIMATING METHOD OF POWER CONSUMPTION FOR STORAGE APPARATUS

(75) Inventors: Masanori Takada, Yokohama (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 1158 days.

(21) Appl. No.: 12/200,242

(22) Filed: Aug. 28, 2008

(65) Prior Publication Data

US 2009/0316541 A1 Dec. 24, 2009

(30) Foreign Application Priority Data

Jun. 20, 2008 (JP) ................................. 2008-161129

(51) Int. Cl.
*G11B 20/10* (2006.01)
*G06F 1/32* (2006.01)

(52) U.S. Cl. ...... 369/47.5; 369/47.52; 369/69; 713/300; 713/320; 713/340

(58) Field of Classification Search .......... 713/300–340; 369/53.18, 47.55, 53.37, 53.26, 31.21, 30.24–30.29, 369/30.36, 32.01, 33.01, 44.32, 47.5–47.53, 369/53.12, 53.13, 53.16, 53.21, 53.42, 69, 369/70, 73, 230, 275.5, 289.1

See application file for complete search history.

(56) References Cited

U.S. PATENT DOCUMENTS

| | | | |
|---|---|---|---|
| 7,243,243 B2 * | 7/2007 | Gedeon ......................... | 713/300 |
| 7,260,043 B2 * | 8/2007 | Kamon et al. ............... | 369/53.26 |
| 7,853,809 B2 * | 12/2010 | Zhang et al. .................. | 713/300 |
| 2003/0152005 A1 | 8/2003 | Miyamoto | |
| 2006/0282686 A1 * | 12/2006 | Bahali et al. .................. | 713/300 |
| 2007/0061512 A1 | 3/2007 | Taguchi et al. | |
| 2007/0294552 A1 | 12/2007 | Kakihara et al. | |

FOREIGN PATENT DOCUMENTS

| | | |
|---|---|---|
| JP | 8-221160 | 8/1996 |
| JP | 2003-242711 | 8/2003 |
| JP | 2005-148853 | 6/2005 |

(Continued)

OTHER PUBLICATIONS

Zedlewski, et al., "Modeling Hard—Disk Power Consumption" of Proceedings of 2nd USENIX Conference on File and Storage Technologies in 2003.

(Continued)

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

Power consumption is calculated in accordance with an operation state of disk devices without using a power meter in a storage system. The power consumption in accordance with the operation state is calculated as follows. That is, information on the power consumption for every type of hard disks is stored in advance when types of I/O process (random/sequential of read and write) operate at idle time up to a limit state in every type of hard disks. A control unit of the storage system aggregates time waiting a response from the hard disks in every type of I/O process. The power consumption of the disks is calculated on the basis of the information on the power consumption stored in advance and a sum of the waiting time of the response from the hard disks.

12 Claims, 24 Drawing Sheets

FOREIGN PATENT DOCUMENTS

| | | |
|---|---|---|
| JP | 2005-215856 | 8/2005 |
| JP | 2006-317355 | 11/2006 |
| JP | 2007-079754 | 3/2007 |
| JP | 2008-3719 | 1/2008 |
| JP | 2008-003719 | 1/2008 |

OTHER PUBLICATIONS

Stoess, et al, Jan; "Energy Management for Hypervisor-Based Virtual Machines." 2007 USENIX Annual Technical Conference, [pp. 1-14].

Rajamani, et al, Karthick; "Application Aware Power Management." IBM Austin Research Lab, The University of Texas at Austin, [pp. 39-48].

"Windows Hardware and Driver Central—Disk Subsystem Performance Analysis for Windows." 2004 Microsoft Corporation. Mar. 2004. [pp. 1-31].

Varki, et al, Elizabeth; "Issues and Challenges in the Performance Analysis of Real Disk Arrays." IEEE Transactions on Parallel and Distributed Systems, vol. 15, No. 6, Jun. 2004. [pp. 559-574].

Martens, et al, Daniel; "Disk Access Analysis for System Performance Optimization." Department of Computer Science, The University of Western Ontario, London, Canada. [pp. 1-6].

Office Action issued in Japanese Patent Application No. 2008-161129 on Mar. 6, 2012.

* cited by examiner

| DISK NUMBER | DISK TYPE MODEL NAME |
|---|---|
| #0 | HUS153030VLF400 |
| #1 | HUS153030VLF400 |
| #2 | HUS153073VLF400 |
| #3 | HUS153073VLF400 |
| #4 | ST3733454FC |
| #5 | ST3733454FC |
| #6 | NONE |
| ... | ... |

| DISK TYPE MODEL NAME | IDLE TIME POWER [W] | RANDOM READ TIME POWER INCREMENT [W] | RANDOM WRITE TIME POWER INCREMENT [W] | SEQUENTIAL READ TIME POWER INCREMENT [W] | SEQUENTIAL WRITE TIME POWER INCREMENT [W] |
|---|---|---|---|---|---|
| HUS153030VLF400 | 14.1 | 4.9 | 1.9 | 1.6 | 1.9 |
| HUS153073VLF400 | 8.9 | 5.1 | 2.3 | 2.0 | 2.3 |
| ST3733454FC | 11.4 | 5.6 | 2.4 | 1.8 | 2.3 |
| ... | ... | ... | ... | ... | ... |

| DISK NUMBER | RANDOM READ CUMULATIVE OPERATION TIME [μs] | RANDOM WRITE CUMULATIVE OPERATION TIME [μs] | SEQUENTIAL READ CUMULATIVE OPERATION TIME [μs] | SEQUENTIAL WRITE CUMULATIVE OPERATION TIME [μs] |
|---|---|---|---|---|
| #0 | 82,148 | 8,651 | 32,823 | 6,647 |
| #1 | 9,384 | 46,095 | 5,020 | 107 |
| ... | ... | ... | ... | ... |

| DISK NUMBER | TAG NUMBER | ACCESS TYPE |
|---|---|---|
| #0 | 0 | RANDOM READ |
|  | 1 | RANDOM READ |
|  | 2 | NONE |
|  | ... | ... |
| #1 | 0 | SEQUENTIAL READ |
|  | 1 | SEQUENTIAL READ |
| ... | | |

| DISK NUMBER 351 | ACCESS TYPE 352 | PRESENT ISSUE COMMAND NUMBER 353 | DISK OPERATION START TIME [µs] 354 |
|---|---|---|---|
| #0 | RANDOM READ | 5 | 8,421,652 |
| | RANDOM WRITE | 0 | — |
| | SEQUENTIAL READ | 10 | 8,421,120 |
| | SEQUENTIAL WRITE | 0 | — |
| #1 | RANDOM READ | 0 | — |
| | RANDOM WRITE | 3 | 8,421,573 |
| ... | ... | ... | ... |

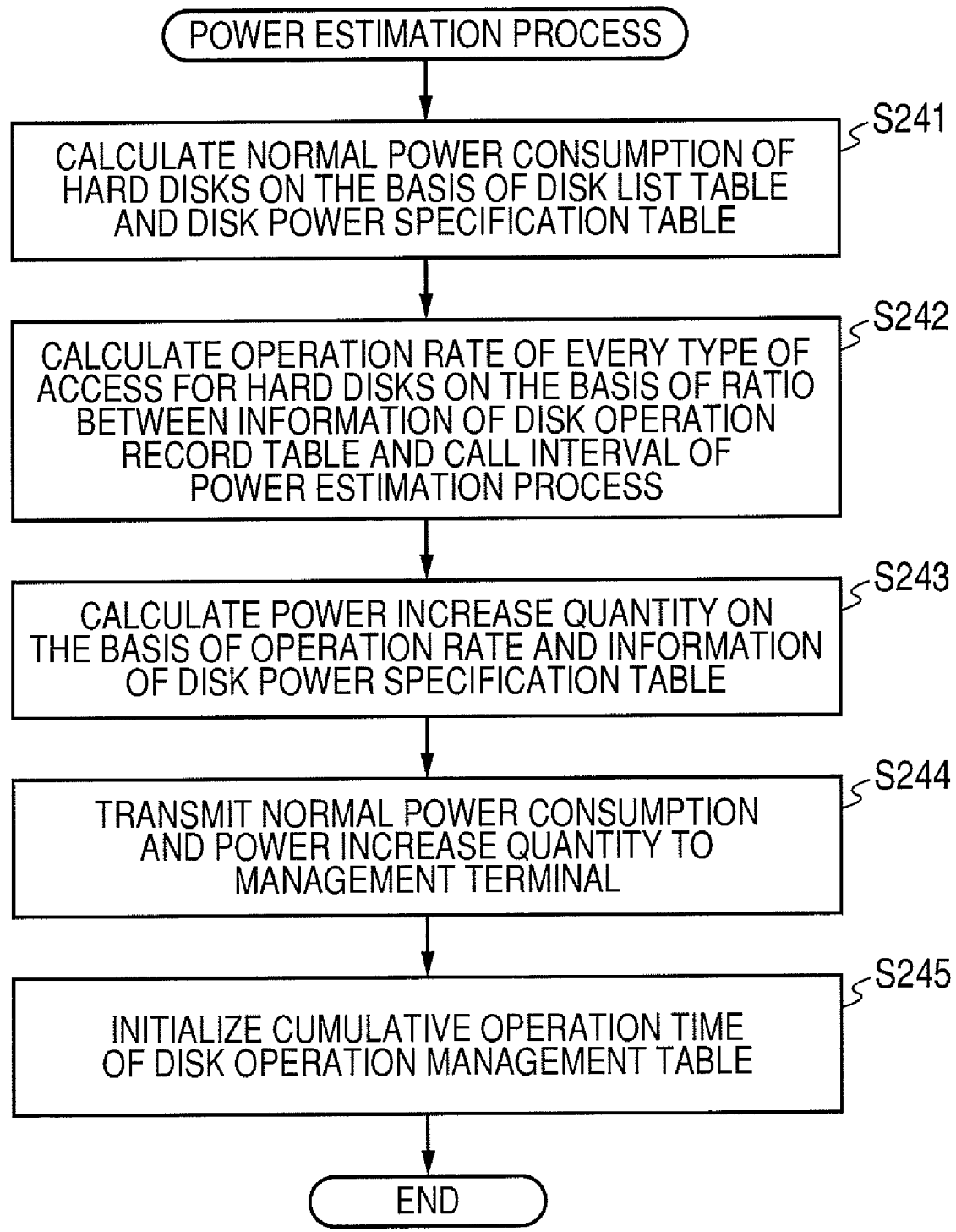

FIG. 13

$P_{static} = P_{idle}$ $P_{RndRd} = AR_{RndRd} \times P_{RndRd}$ $P_{RndWr} = AR_{RndWr} \times P_{RndWr}$ $P_{SeqRd} = AR_{SeqRd} \times P_{SeqRd}$ $P_{SeqWr} = AR_{SeqWr} \times P_{SeqWr}$ $P_{dynamic} = P_{RndRd} + P_{RndWr} + P_{SeqRd} + P_{SeqWr}$ $P_{idle}$: IDLE TIME POWER 322 IN DISK POWER SPECIFICATION TABLE 32

$P_{RndRd}$: RANDOM READ TIME POWER INCREMENT 323 IN DISK POWER SPECIFICATION TABLE 32

$P_{RndWr}$: RANDOM WRITE TIME POWER INCREMENT 324 IN DISK POWER SPECIFICATION TABLE 32

$P_{SeqRd}$: SEQUENTIAL READ TIME POWER INCREMENT 325 IN DISK POWER SPECIFICATION TABLE 32

$P_{SeqWr}$: SEQUENTIAL WRITE TIME POWER INCREMENT 326 IN DISK POWER SPECIFICATION TABLE 32

$AR_{RndRd}$: OPERATION RATE OF RANDOM READ ACCESS $AR_{RndWr}$: OPERATION RATE OF RANDOM WRITE ACCESS $AR_{SeqRd}$: OPERATION RATE OF SEQUENTIAL READ ACCESS $AR_{SeqWr}$: OPERATION RATE OF SEQUENTIAL WRITE ACCESS $P_{static}$: HARD DISK POWER IN NORMAL STATE $P_{dynamic}$: INCREASE QUANTITY BY ACCESS OF HARD DISK POWER $P_{RndRd}$: INCREASE QUANTITY BY RANDOM READ OF HARD DISK POWER $P_{RndWr}$: INCREASE QUANTITY BY RANDOM WRITE OF HARD DISK POWER $P_{SeqRd}$: INCREASE QUANTITY BY SEQUENTIAL READ OF HARD DISK POWER $P_{SeqWr}$: INCREASE QUANTITY BY SEQUENTIAL WRITE OF HARD DISK POWER

| SITE 991 | AVERAGE POWER CONSUMPTION [W] 992 | POWER INCREASE [W] 993 | | | | IDLE TIME POWER [W] 994 |
|---|---|---|---|---|---|---|
| | | RANDOM READ POWER INCREASE [W] | RANDOM WRITE POWER INCREASE [W] | SEQUENTIAL READ POWER INCREASE [W] | SEQUENTIAL WRITE POWER INCREASE [W] | |
| DISK #0 | 18.0 | 3.7 | 0.2 | 0.0 | 0.0 | 14.1 |
| DISK #1 | 16.3 | 0.0 | 0.0 | 2.0 | 0.2 | 14.1 |
| ... | ... | ... | ... | ... | ... | ... |
| SUM | 1,325 | 30 | 18 | 0 | 12 | 1,260 |

FIG. 16

| TIME 511 | SITE 512 | AVERAGE POWER CONSUMPTION [W] 513 | DISK POWER INCREASE [W] 514 | | | | IDLE TIME POWER [W] 515 |
|---|---|---|---|---|---|---|---|
| | | | RANDOM READ POWER INCREASE [W] | RANDOM WRITE POWER INCREASE [W] | SEQUENTIAL READ POWER INCREASE [W] | SEQUENTIAL WRITE POWER INCREASE [W] | |
| 05/11 10:00–11:00 | DISK #0 | 18 | 3.7 | 0.2 | 0 | 0 | 14.1 |
| | ... | ... | ... | ... | ... | ... | ... |
| | SUM | 1,325 | 30 | 8 | 15 | 12 | 1,260 |
| | ... | ... | ... | ... | ... | ... | ... |
| 05/11 –12:00 | SUM | 1,570 | 257 | 12 | 23 | 18 | 1,260 |
| ... | | | | | | | |

FIG. 22

ADDITION OF DISK TYPE

| DISK TYPE NAME | HUS153073VLF400 | |
|---|---|---|
| IDLE TIME POWER | 14.1 | [W] |
| RANDOM READ TIME POWER INCREMENT | 4.9 | [W] |
| RANDOM WRITE TIME POWER INCREMENT | 1.9 | [W] |
| SEQUENTIAL READ TIME POWER INCREMENT | 1.6 | [W] |
| SEQUENTIAL WRITE TIME POWER INCREMENT | 1.9 | [W] |

ADD    CANCEL

64

| ITEM NAME | VALUE | |
|---|---|---|
| DISK TYPE NAME | HUS153073VLF400 | 641 |
| IDLE TIME POWER | 14 | 642 |
| RANDOM READ TIME POWER INCREMENT [W] | 4.9 | 643 |
| RANDOM WRITE TIME POWER INCREMENT [W] | 1.9 | 644 |
| SEQUENTIAL READ TIME POWER INCREMENT [W] | 1.6 | 645 |
| SEQUENTIAL WRITE TIME POWER INCREMENT [W] | 1.9 | 646 |

STORAGE APPARATUS AND ESTIMATING METHOD OF POWER CONSUMPTION FOR STORAGE APPARATUS

CROSS REFERENCES TO RELATED APPLICATIONS

This application relates to and claims priority from Japanese Patent Application No. P2008-161129, filed on Jun. 20, 2008, the entire disclosure of which is incorporated herein by reference.

BACKGROUND OF THE INVENTION

The present invention relates to a storage apparatus capable of storing data, and more particularly to the storage apparatus capable of estimating power consumption and a method of estimating power consumption of the storage apparatus estimating power consumption.

There is known a so-called storage system in which a sub system is configured by a disk array including a plurality of hard disk drives and which stores data in the disk array.

The storage system includes host interfaces, disk interfaces, cache memories, processor units, and switch units connecting the host interfaces, the disk interfaces, the cache memories, and the processor units one another. The storage system is connected to host computers through the host interfaces and also connected to a disk array through the disk interfaces.

Functions of units in the storage system are as follows. That is, the host interfaces are used to connect the storage system to the host computers. The disk interfaces are used to connect the storage system to the disk array. The cache memories stores a part of data in the disk array so that the host computers can access the data faster. The switch units are used to connect the units of the storage system to each other. The processor units are used to control the unit of the storage system.

In such a storage system, a plurality of computers is connected. Accordingly, the storage system is used at a data center or the like under the environment in which many computers aggregate in many cases.

Meanwhile, power consumption of the data center and the computers at the data center has been increasing. In particular, since the power consumption of the storage system is large, it is required to save the power consumption in a way of controlling the power consumption of hard disks, reallocate the data among disks, or so on. In this case, it is necessary to precisely calculate the power consumption for each component in accordance with an operation state of the component.

A related technique is disclosed in JP-A-2007-079754. This document discloses a technique capable of measuring power consumption for every operating component to show the power consumption to a system manager in association with rated electric power, the number of I/O processes, traffic, and the like.

In addition, JP-A-2008-003719 discloses a technique in which a threshold value for electric power is set to the power consumption of hard disks, and the rotation frequency of the hard disks or the power of the hard disks is controlled to be turned on and off so that the electric power is kept equal to or less than the threshold value.

In "Modeling Hard-Disk Power Consumption" of Proceedings of 2nd USENIX Conference on File And Storage Technologies in 2003, there is disclosed a method of estimating power consumption by executing a detailed state simulation (simulation of state transition of seek, cue standby, access, and the like from I/O trace) in compact hard disk drives used in laptop computers or the like. In addition, as a simple method, there is disclosed a method of estimating power consumption by using a ratio of an operation time.

SUMMARY OF THE INVENTION

In the power measuring method disclosed in JP-A-2007-079754, however, power meters have to be used in every set of components of which power consumption will be required, when the power consumption for the set such as hard disks corresponding to a logical volume, for example, is necessary to be known precisely. Moreover, when the set of which the power wants to be required is changed, for example, a logic volume is re-configured by combining arbitrary hard disks, the power meters have to be used in a more specific unit, that is, every hard disk.

In the technique disclosed in JP-A-2008-003719, controlling the power consumption is performed by using a maximum power value which each component can consume, that is, rated electric power. Since there is a big difference between actual power consumption in the control of the power consumption and the rated electric power, the controlling cannot control the storage system accurately.

In the estimation of the disk state simulation disclosed in "Modeling Hard-Disk Power Consumption" of Proceedings of 2nd USENIX Conference on File And Storage Technologies in 2003, the simulation for the detailed state of the hard disks has to be executed. Therefore, much calculation is needed for estimation. In addition, in the estimation method using the ratio of the operation time, it is required to make the storage controller able to retrieve information on the operation time by reforming a firmware of the hard disks so as to retrieve the information on the operation time from the hard disks. That is, it is required to reform the firmware of every type of the hard disks. Moreover, when a type (a space or temporal locality) of disk access has characteristics, a problem such as insufficient precision may occur.

As described above, it is difficult for the known techniques to calculate the power consumption with high precision in every component.

An object of the invention is to calculate the power consumption with high precision in accordance with an operation state of disk drives without using a power meter in a storage apparatus.

In order to solve the above-described problems, a storage apparatus includes disk drives and performs an I/O process of data stored in the disk drives in accordance with an I/O process request from a higher-level device. The storage apparatus further includes a control unit which calculates power consumption of the disk devices varying with the I/O process on the basis of power information necessary for the I/O process and operation rates which are ratio of time necessary for the I/O process per predetermined unit time; and a display unit which displays the power consumption calculated by the control unit.

According to the storage apparatus having the above-described configuration, it is possible to calculate the power consumption of the disk drives of the storage apparatus in accordance with the operation state even without using the power meter. As a result, the power of the disk drives can be controlled with high precision.

BRIEF DESCRIPTION OF THE DRAWINGS

FIG. 4 is a diagram illustrating an example of a disk list table according to the first embodiment.

FIG. 5 is a diagram illustrating an example of a disk power specification table according to the first embodiment.

FIG. 6 is a diagram illustrating an example of a disk operation record table according to the first embodiment.

FIG. 7 is a diagram illustrating an example of a tag management table according to the first embodiment.

FIG. 8 is a diagram illustrating an example of an I/O issue state table according to the first embodiment.

FIG. 12 is a flowchart illustrating a process example of a power estimation function according to the first embodiment.

FIG. 13 is a diagram illustrating an example of a power estimation method according to the first embodiment.

FIG. 16 is a diagram illustrating an example of a power consumption record table according to the first embodiment.

FIG. 22 is a diagram illustrating a disk type addition form of the storage management program addition function according to the second embodiment.

DESCRIPTION OF THE PREFERRED EMBODIMENT

Hereinafter, preferred embodiments of the invention will be described with reference to the accompanying drawings.

First Embodiment

In a first embodiment of the invention, estimating power consumption of hard disks used in a storage system will be described. In this embodiment, power consumption in accordance with an operation state is calculated in the following manner. A control unit of the storage system aggregates time waiting a response of every type of I/O process from hard disks, when power consumption (hereinafter, referred to as "power consumption basis data") in a state which the hard disks always operate each type of I/O process (random/sequential of read and write) and in a state that the hard disks are idle in every type of hard disks is known. Subsequently, the power consumption in accordance with the operation state is calculated on the basis of the power consumption basis data and operation information. Hereinafter, the details of the invention will be described.

Figure 1:
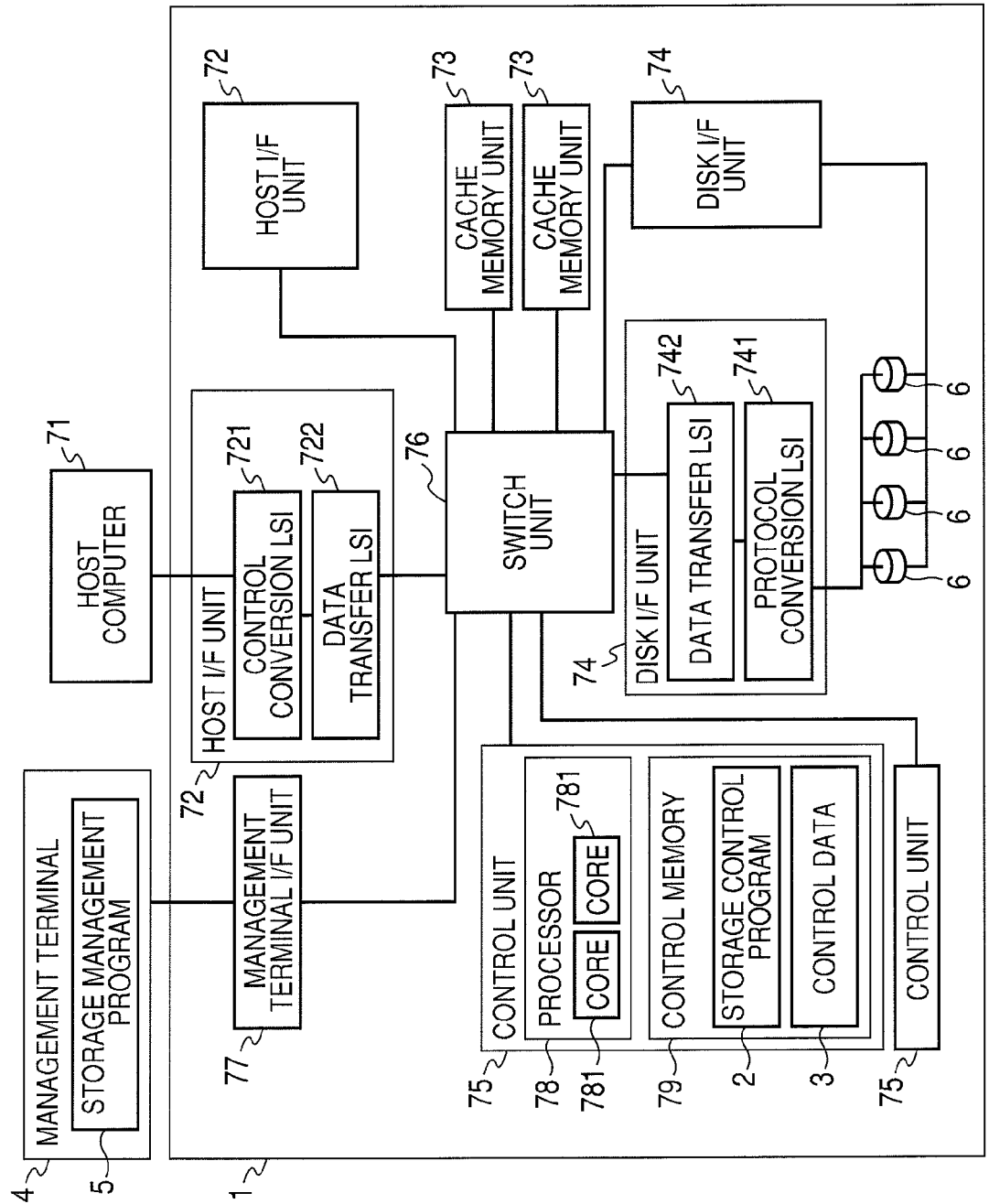
FIG. 1 is a diagram illustrating a configuration of a storage system according to a first embodiment.

FIG. 1 is a diagram illustrating a configuration of a storage system 1 to which the invention is applied. The storage system 1 includes a plurality of hard disks 6, host I/F units 72 exchanging information with host computers 71, disk I/F units 74 exchanging data with the hard disks 6, cache memory units 73 storing data used to access a part of data stored in the hard disks 6 at high speed, control units 75 controlling the entire storage system 1, one or more management terminal I/F units 77 exchanging information with one or more management terminals 4, and switch units 76 connecting the units one another.

A configuration of the host I/F units 72 is as follows. That is, the host I/F units 72 includes one or more protocol conversion LSIs 721 which converts protocols such as a fiber channel used to connect the storage system to the host computers 71 and protocols such as PCI used inside the storage system 1 and one or more data transfer LSIs 722 which transfer data between the protocol conversion LSIs 721 and the cache memory units 73 in accordance with instructions of the control units 75.

A configuration of the disk I/F units 74 is as follows. That is, the disk I/F units 74 includes one or more protocol conversion LSIs 741 which converts protocols such as Fibre Channel or SAS (Serial Attached SCSI) used to connect with the hard disks 6 and protocols used inside the storage system 1 and one or more data transfer LSIs 742 which transfer data between the hard disks 6 and the cache memory units 73 in accordance with instructions of the control units 75.

A configuration of the control units 75 is as follows. That is, the control units 75 include one or more processor 78 and one or more control memory 79. The processors 78 may include a plurality of processor cores 781. In the processors 78, a storage control program 2 controlling the storage system 1 operates to control data transfer and the like in the storage system 1. The control memories 79 stores the storage control program 2 described above and control data 3, which is information necessary to control the storage system 1.

A configuration of the management terminals 4 is as follows. That is, the management terminals 4 store a storage management program 5 managing the storage system 1. The storage system 1 is managed on the basis of the storage management program 5.

Figure 2:
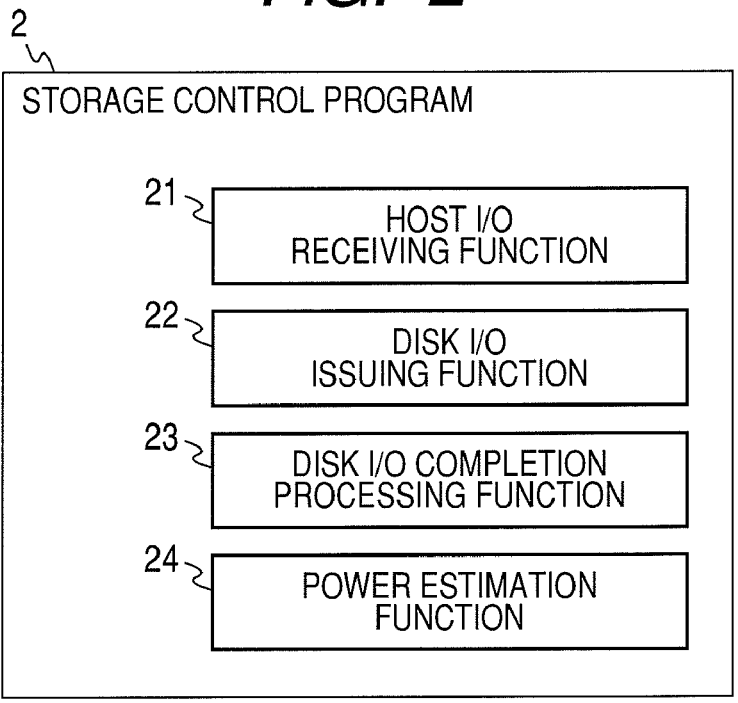
FIG. 2 is a diagram illustrating functions of a storage control program according to the first embodiment.

FIG. 2 is a diagram illustrating functions of the storage control program 2. The storage control program 2 includes a host I/O receive function 21, a disk I/O issue function 22, a disk I/O completion function 23, and a power estimation function 24.

Figure 3:
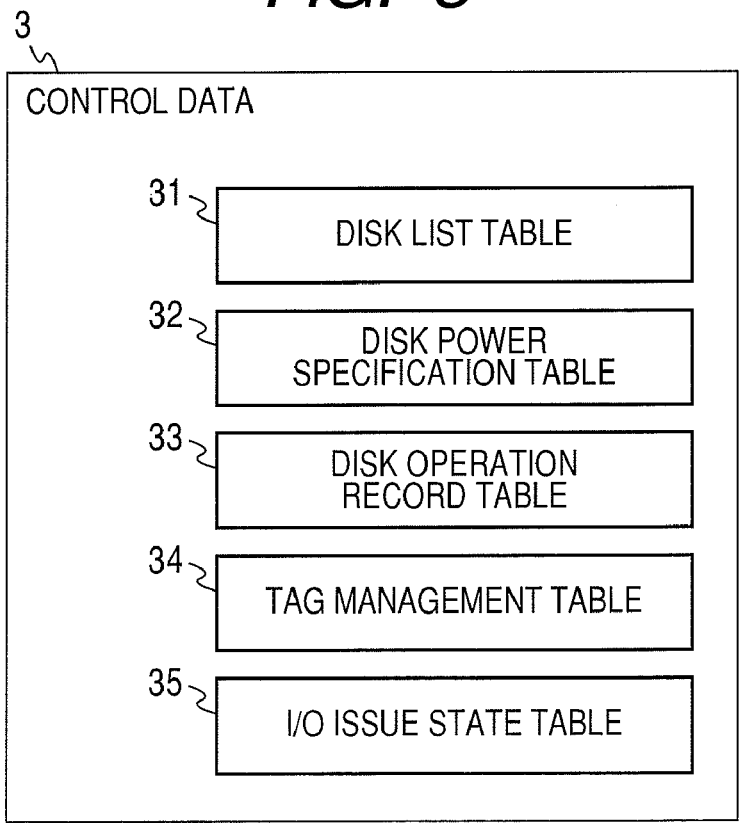
FIG. 3 is a diagram illustrating an example of control data according to the first embodiment.

FIG. 3 is a diagram illustrating a configuration of the control data 3. The control data 3 includes a disk list table 31, a disk power specification table 32, a disk operation record table 33, a tag management table 34, and an I/O issue state table 35.

FIG. 4 is a diagram illustrating an example of the disk list table 31. The disk list table 31 is used to record types and locations of the hard disks 6 mounted in the storage system 1. The disk list table 31 is updated when a part of the hard disks is newly added or removed. Moreover, the disk list table 31 is referred when power is estimated by the power estimation function 24.

A disk number 311 indicates the locations where the hard disks 6 are mounted, that is, slot numbers. A disk model name 312 indicates which type of hard disk is mounted at the location corresponding to the disk number.

FIG. 5 is a diagram illustrating an example of the disk power specification table 32. The disk power specification table 32 is used to maintain power consumption in various states in every type of hard disks 6 mounted in the storage system 1. The disk power specification table 32 is updated whenever a new type of hard disk is newly added. The disk power specification table 32 is referred when power is estimated by the power estimation function 24.

The disk model name 321 is used to identify the type of hard disk. What can identify every hard disk that has different power specification, for example, a model name of the hard disk, is used. An idle time power 322 indicates power consumption of the corresponding hard disk 6 which is in an idle state. The idle state is a state that the power of the hard disk 6 is turned on but the disk I/F units 72 don't access to the hard disk 6

A random read time power increment 323 indicates a difference between the power at idle time and that in a state where the corresponding hard disk 6 receives only a random read and in a limit operation state. The random read refers to a state where the host computer 71 issues a read access to the whole hard disks 6 without locality. The limit operation state refers to a state where the hard disks 6 is always operating the read requests A random write time power increment 324 indicates a difference between the power at the idle time and that in a state where the corresponding hard disk 6 receives only a random write and in the limit operation state. The random write refers to a state where the host computer 71 issues a write access to the whole hard disks 6 without locality.

A sequential read time power increment 325 indicates a difference between the power at the idle time and that in a state where the corresponding hard disk 6 receives only a sequential read and in the limit operation state. At this time, the sequential read refers to a state where the host computer 71 sequentially issues the read access to an area of the hard disks 6 sequentially.

A sequential write time power increment 326 indicates a difference between the power at the idle time and that in a state where the corresponding hard disk 6 receives only a sequential write and in the limit operation state. At this time, the sequential write refers to a state where the host computer 71 sequentially issues the write access to the area of the hard disks 6 sequentially.

FIG. 6 is a diagram illustrating an example of the disk operation record table 33. The disk operation record table 33 is used to record how long the access to the hard disks 6 is made during operation of the storage system 1. The disk operation record table 33 is updated when there are accesses to the hard disks 6. In addition, the disk operation record table 33 is referred the power estimation function 24 estimates the power The disk number 331 indicates the location where the hard disks 6 are mounted. A random read cumulative operation time 332 is a total of time when the random read access has been issued to the corresponding hard disks 6. It is the same for a random write cumulative operation time 333, a sequential read cumulative operation time 334, and a sequential write cumulative operation time 335 are the same as a random read cumulative operation time 332 except they records the time of corresponding accesses.

FIG. 7 is a diagram illustrating an example of the tag management table 34. The tag management table 34 is used to identify the request corresponding responses by attaching a tag, which is an identifier, to every access issued to each of the hard disks 6, even when multiple accesses are issued to one hard disk 6. A disk number 341 indicates the locations (the slot numbers, etc.) where the hard disks 6 are mounted. A tag number 342 is a number which is uniquely assigned to each access to the same hard disk 6. The tag number is a unique number which is assigned upon issuing the accesses. An access type 343 refers to types of access to the hard disks 6.

FIG. 8 is a diagram illustrating an example of the I/O issue state table 35. The I/O issue state table 35 is used to record which type of access is issued to the hard disks 6 and what time the access starts to be issued. The I/O issue state table 35 is referred and updated when the access is newly issued to the hard disks 6 by the disk I/O issue function 22 and when the response from the hard disks 6 is processed by the disk I/O completion function 23.

A disk number 351 indicates the location (the slot numbers, etc.) where the hard disks 6 are mounted. An access type 352 indicates to which type of access a present issue command number 353 and a disk operation start time 354 on the right columns belong. The present issue command number 353 indicates the number of the accesses of the corresponding disk number and access type which is issued to the hard disks 6 at present. The disk operation start time 354 indicates what time the access of the corresponding disk number and access type is issued in elapsed time (μs) after activation of the storage system 1.

Figure 9:
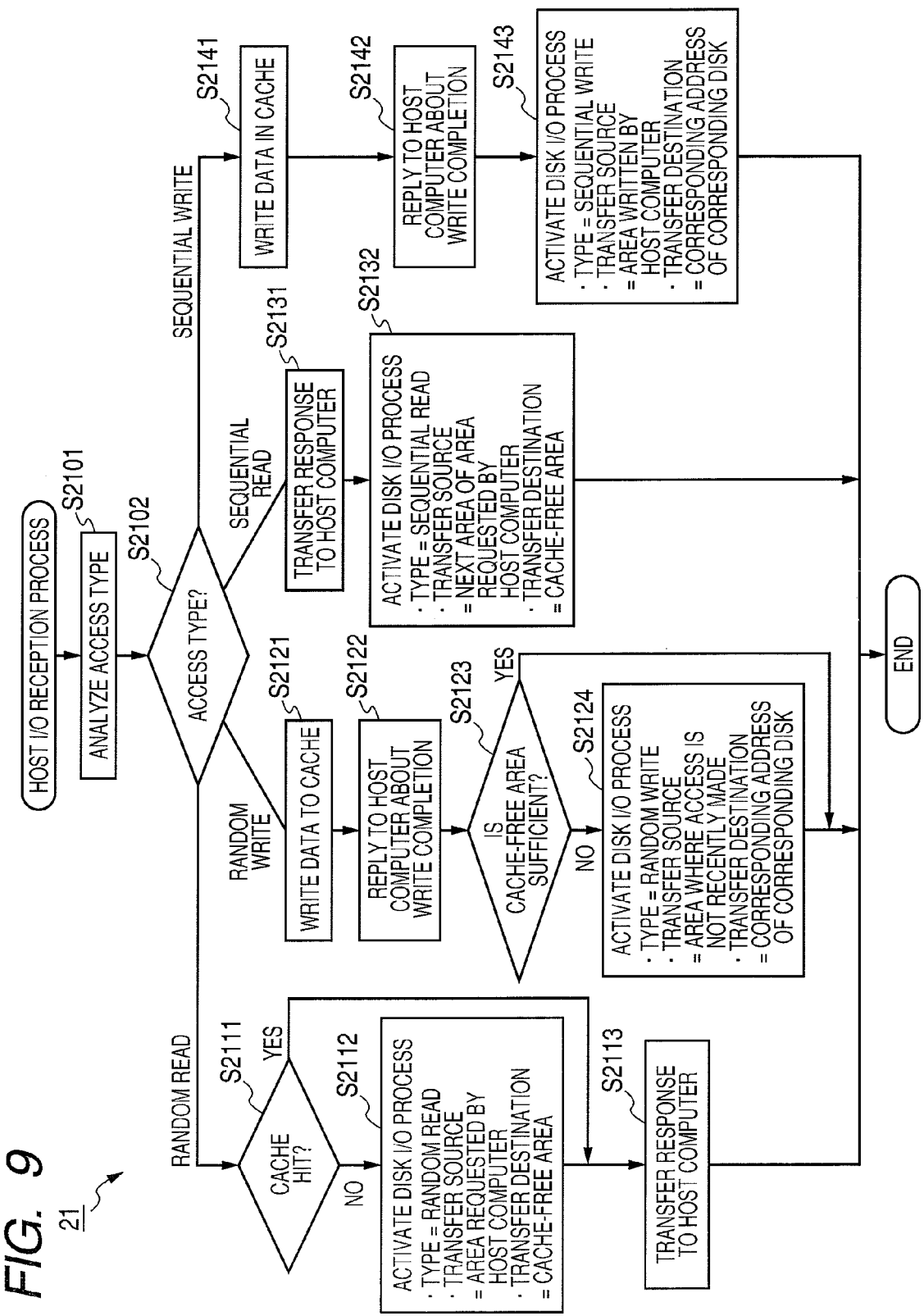
FIG. 9 is a flowchart illustrating a process example of the disk I/O receive function according to the first embodiment.

FIG. 9 is a flowchart illustrating an example of the host I/O receive function 21. The host I/O receive function 21 is a function which is called when a command of a read request or a write request is received from the host computer 71. The host I/O receive function 21 distinguishes types of command to determine whether it is necessary to make an access to the hard disks 6. Hereinafter, a process of the host I/O receive function 21 will be described in sequence.

Upon being called, the host I/O receive function 21 first analyzes an access request from the host computer (S2101). The access type is a sequential access or a random access of read and write. Subsequently, the host I/O receive function 21 branches the process depending on the types of access (S2102).

When the access types is the random read, the host I/O receive function 21 determines whether requested data is in the cache memory unit 73 (cache hit) or not (S2111). When the requested data is not in the cache memory unit, the host I/O receive function 21 calls the disk I/O issue function 22. The host I/O receive function 21 adds information of the types of access in order to measure access time for every type of access. That is, the host I/O receive function 21 sets the type of access to the random read, a transfer source of the access to an address of a hard disk having the data requested from the host computer 71, and a transfer destination to an free area of the cache memory unit 73, and the disk I/O issue function 22 is called (S2112). Then, the process proceeds to step S2113.

When the requested data is in the cache memory unit 73 in the step S2111 (cache hit) (Yes in S2111), the host I/O receive function 21 transfers the request data as a response to the host computer 71 (S2113).

A case where the access type is the random write in step S2102 will be described. First, the host I/O receive function 21 writes data transferred from the host computer 71 to the cache memory unit 73 (S2121). Subsequently, the host I/O receive function 21 notifies that the write command is completed to the host computer 71 (S2122). Next, the host I/O receive function 21 determines whether the free area is sufficient in the cache memory 73 (S2123).

When the free area is sufficient, the host I/O receive function 21 just terminates the process.

Alternatively, when the empty area is not sufficient, it is necessary to write the write data to the hard disks 6 since the write data cannot be received from the host computer 71. In this case, the host I/O receive function 21 sets the type of access to the random write, the transfer source to an area where an access has not been made recently in the cache memory unit 73, the transfer destination to an address of the corresponding hard disk 6 to an area where an access is not made. Then, the disk I/O issue function 22 is called (S2124).

A case where the type of access is the sequential read in step S2102 will be described. In the case of the sequential access, the data requested from the host computer 71 is in the cache memory unit 73 since the host I/O receive function 21 predicts that the access from the host computer 71 will be made. Therefore, the host I/O receive function 21 transfers the data to the host computer 71 as a response (S2131). In addition, since it is predicted that the host computer 71 makes an access to the next area, the host I/O receive function 21 reads data of the next area to store the data in the cache memory unit 73 in advance. That is, the host I/O receive function 21 sets the access type to the sequential read, the transfer source to the next area of the area to which the host computer 71 makes a request, and the transfer destination to an empty area of the cache memory unit 73. Then, the disk I/O issue function 22 is called (S2132).

Finally, a case where the access type is the sequential write in step S2102 will be described. In this case, the host I/O receive function 21 first writes data transferred from the host computer 71 to the cache memory unit 73 (S2141). Subsequently, the host I/O receive function 21 notifies the write completion to the host computer 71 (S2142). In the case of the sequential write, it is rare that data is written to the same area. Therefore, even though the written data is just kept in the cache memory unit 73, an advantage of a performance using the cache hit is not expected in many cases. Accordingly, it is preferable that the written data is stored from the host computer 71 to the hard disk 6. Specifically, the host I/O receive function 21 sets the access type to the sequential write, the transfer source to an area where the host computer writes the data in the cache memory unit 73, and the transfer destination to the corresponding address of the corresponding hard disk 6. Then, the disk I/O issue function 22 is called (S2143).

Figure 10:
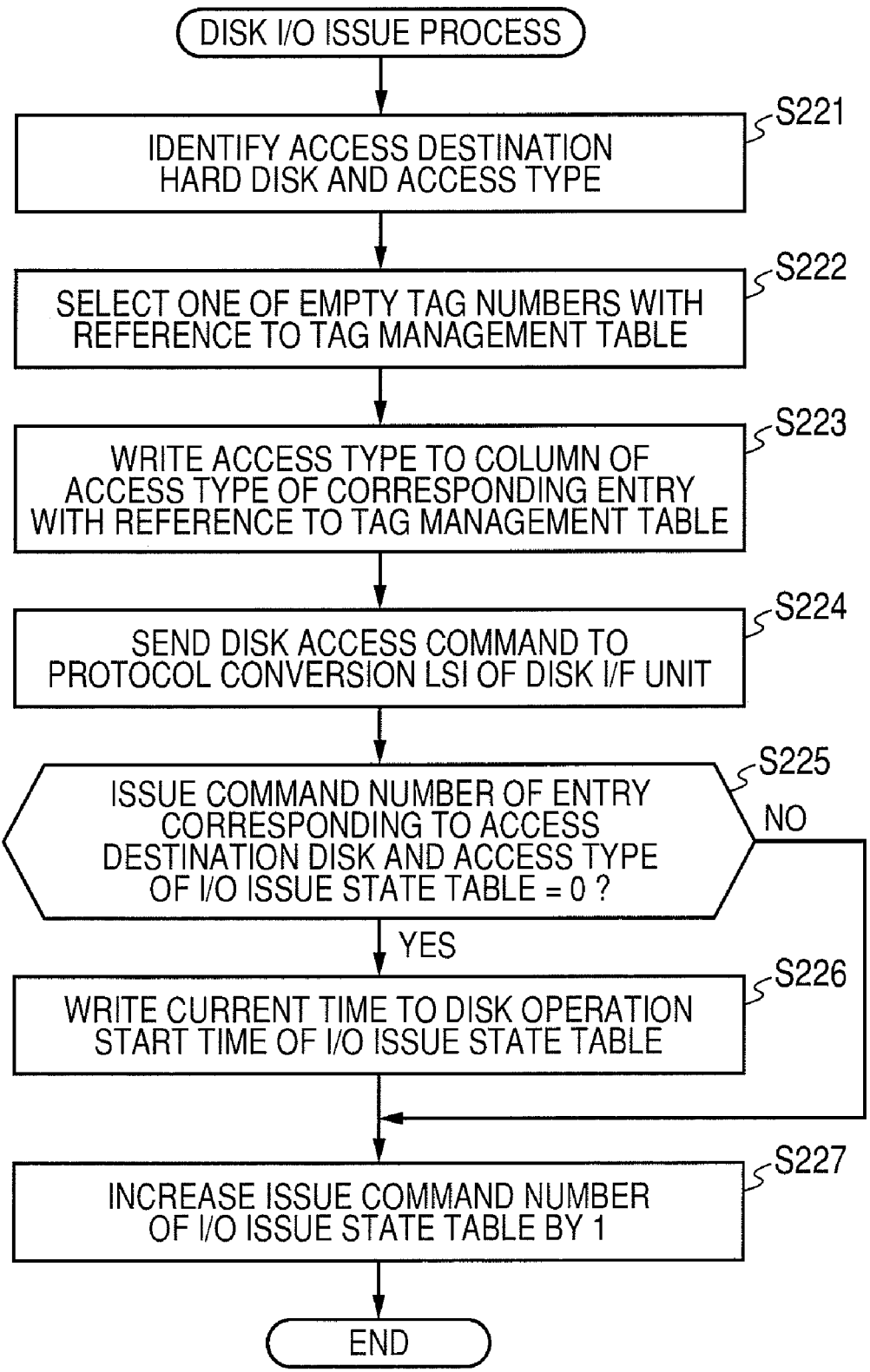
FIG. 10 is a flowchart illustrating a process example of the disk I/O issue function according to the first embodiment.

FIG. 10 is a flowchart illustrating an example of the disk I/O issue function 22. The disk I/O issue function 22 is a function of issuing an access to the hard disks 6. The disk I/O issue function 22 is called from the host I/O receive function 21, if necessary.

Hereinafter, a process of the disk I/O issue function 22 will be described in sequence.

Upon being called, the disk I/O issue function 22 first analyzes a parameter received from the host I/O receive function 21 as a caller and identifies the hard disks 6 as an access destination and the types of access (S221). Subsequently, the disk I/O issue function 22 selects an free tag number, that is, a tag number in which the type of access corresponding to the tag number is not written with reference to the tag management table 34 (S222).

Subsequently, the disk I/O issue function 22 writes the analyzed type of access to the access type 343 of an entry corresponding to the tag number selected from the tag management table 34 (S223).

Subsequently, the disk I/O issue function 22 sends a disk access command to the protocol conversion LSI 741 of the disk I/F unit 74 (S224).

Subsequently, the disk I/O issue function 22 determines whether the issue command number 353 is "0" in an entry corresponding to the hard disk (disk number) as the access destination and the type of access with reference to the I/O issue state table 35 (S225).

When the issue command number 353 is "0" (Yes in step S225), the disk I/O issue function 22 writes the current time in the corresponding entry of the disk operation start time 354 in the I/O issue state table 35 since the disk I/O issue function 22 has not been called until now (S226). Then, the process proceeds to step S227.

Alternatively, when the issue command number 353 is not "0" in step S225 (No in step S225), the process proceeds to step S227 since the disk I/O issue function 22 has issued the same type of access to the same hard disk, that is, has already been called.

Subsequently, the disk I/O issue function 22 increases the corresponding entry of the issue command number 353 in the I/O issue state table 35 by 1 (S227), and then the process ends.

Figure 11:
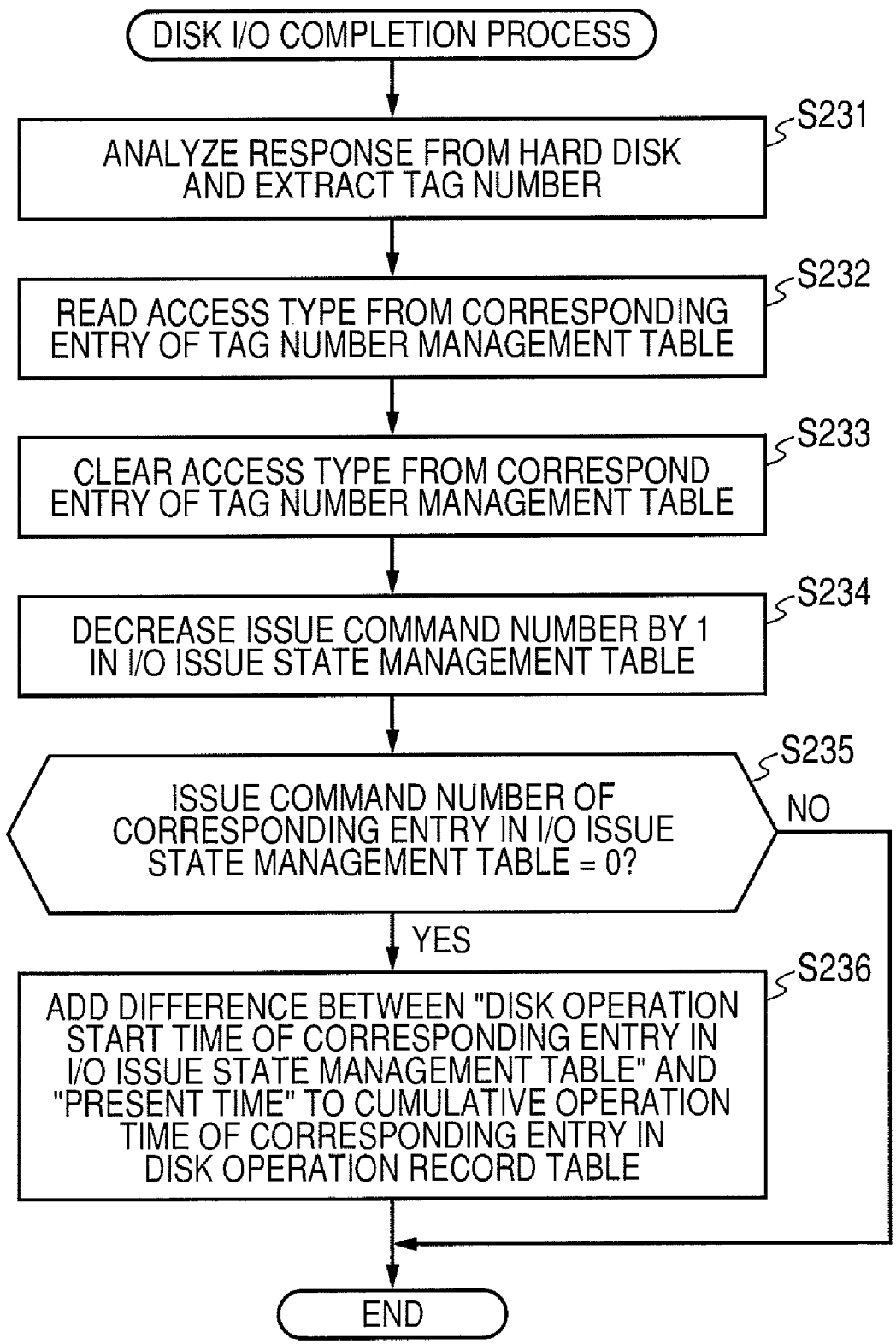
FIG. 11 is a flowchart illustrating a process example of a disk I/O completion function according to the first embodiment.

FIG. 11 is a flowchart illustrating an example of the disk I/O completion function 23. The disk I/O completion function 23 is a function which is called when a response to the disk access command issued by the disk I/O issue function 22 is received from the hard disk 6. The disk I/O completion function 23 records time spent for access, which is necessary for power estimation described below.

Hereinafter, a process of the disk I/O completion function 23 will be described in sequence.

In the disk I/O completion function 23, a response from the hard disk 6 is first analyzed to extract the tag number (S231). Subsequently, the disk I/O completion function 23 reads the access type 343 of an entry corresponding to the extracted tag number with reference to the tag management table 34 (S232). Subsequently, the disk I/O completion function 23 clears the type of access of the entry from the tag management table 34 (S233). Subsequently, the disk I/O completion function 23 decreases the issue command number 353 of the entry corresponding to the disk number and the access type by 1 in the I/O issue state management table 35 (S234).

Next, the disk I/O completion function 23 determines whether the corresponding entry of the issue command number 353 in the I/O issue state management table 35 is "0" (S235).

When the issue command number 353 is "0" (Yes in step S235), the disk I/O completion function 23 records the present access time having elapsed until now as operation information since one access having the type of access has not been issued until now. That is, a difference between the disk operation start time 354 of the corresponding entry in the I/O issue state management table 35 and the present time is calculated, and then the difference is added to the cumulative operation time of the type of access corresponding to the corresponding entry in the disk operation record table 33, that is, one of the cumulative operation times 332 to 335 (S236). Then, the disk I/O completion function 23 terminates the process.

Alternatively, when the issue command number is not "0" in step S235 (No in step S235), the disk I/O completion function 23 just terminates the process since the access having the same type of access is in progress.

FIG. 12 is a flowchart illustrating an example of the power estimation function 24. The power estimation function 24 estimates power consumed by the hard disks 6 of the storage system 1 with reference to the information of the disk operation record table 33, and transfers an estimation result to the management terminal 4.

Hereinafter, a process of the power estimation function 24 will be described in sequence.

In the power estimation function 24, static power consumption of the hard disks 6 is calculated with reference to the disk list table 31 and the disk power specification table 32 (S241). Specifically, as for the static power of the hard disks 6, the idle time power 322 of the corresponding entry in the disk power specification table 32 is set to the static power, referring the disk model name of every entry of the disk list table 31.

Next, the power estimation function 24 calculates an operation rate of every type of access for the hard disks 6 on the basis of a ratio between the information of the disk operation record table 33 and a call interval of the power estimation function 24 (S242). For example, on the assumption that the call interval of the power estimation function 24 is 1 second and the random read cumulative operation time 332 of the disk operation record table 33 is 1 millisecond, an operation rate of the random read is $1/1000$.

Next, the power estimation function 24 calculates a power increase quantity of each hard disk on the basis of the calculated operation rate and the information of the disk power specification table 32 (S243). For example, on the assumption that the operation rate is $1/10$ and the power increment of the disk power specification table 32 is 4.9 Watts, the power increase quantity is 0.49 Watt. Subsequently, the power estimation function 24 transfers the normal power consumption calculated in the step S241 and the power increase quantity calculated in the step S243 to the management terminal 4 (S244). Finally, the power estimation function 24 initializes the cumulative operation times 332 to 335 of the disk operation record table 33 to "0" (S245).

FIG. 13 is a diagram illustrating an example of a method of calculating the power increase quantity of each hard disk performed by the power estimation function 24 in steps S241 and S243. The power increase quantity of every type of access is calculated on the basis of the static power from the idle time power 322 of the power specification table 32, the power increments 323 to 336 of every type of access in the power specification table 32, and the operation rate of every type of access calculated in step S242 by the power estimation function 24.

Figures 14, 15:
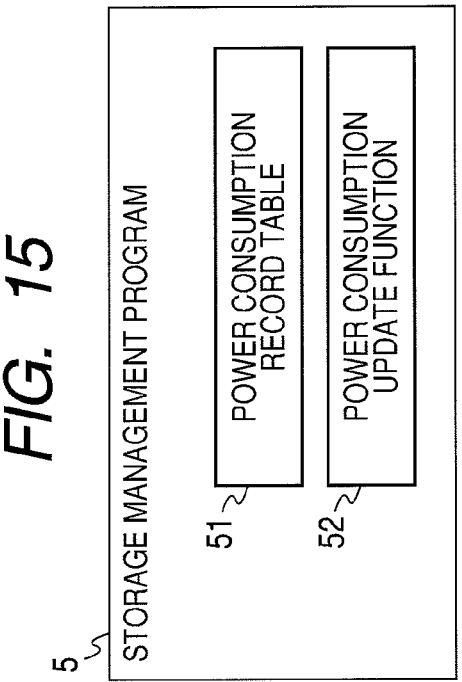
FIG. 14 is a diagram illustrating an example of power estimation data according to the first embodiment.
FIG. 15 is a diagram illustrating a configuration of a storage management program according to the first embodiment.

FIG. 14 is a diagram illustrating an example of data transferred to the management terminal 4 in step S244 by the power estimation function 24. A site 991 indicates to which hard disk the power consumptions on right columns belong or indicates a sum of the power consumptions. An average power consumption 992 indicates an average power consumption for each hard disk and the sum after the previous time. A disk power increase 993 indicates power increase for every type of access. An idle time power 994 indicates power when no access is issued.

FIG. 15 is a diagram illustrating a configuration of a storage management program 5. The storage management program 5 includes a power consumption record table 51 and a power consumption update function 52.

FIG. 16 is a diagram illustrating an example of the power consumption record table 51. The power consumption record table 51 is used to record power data transferred from the storage system 1 and to display contents on a monitor screen of the management terminal 4 whenever a user requests the contents. A time 511 indicates time of the data. Other items are the same as those of the data transferred to the management terminal 4 by the power estimation function 24 as shown in FIG. 14.

Figure 17:
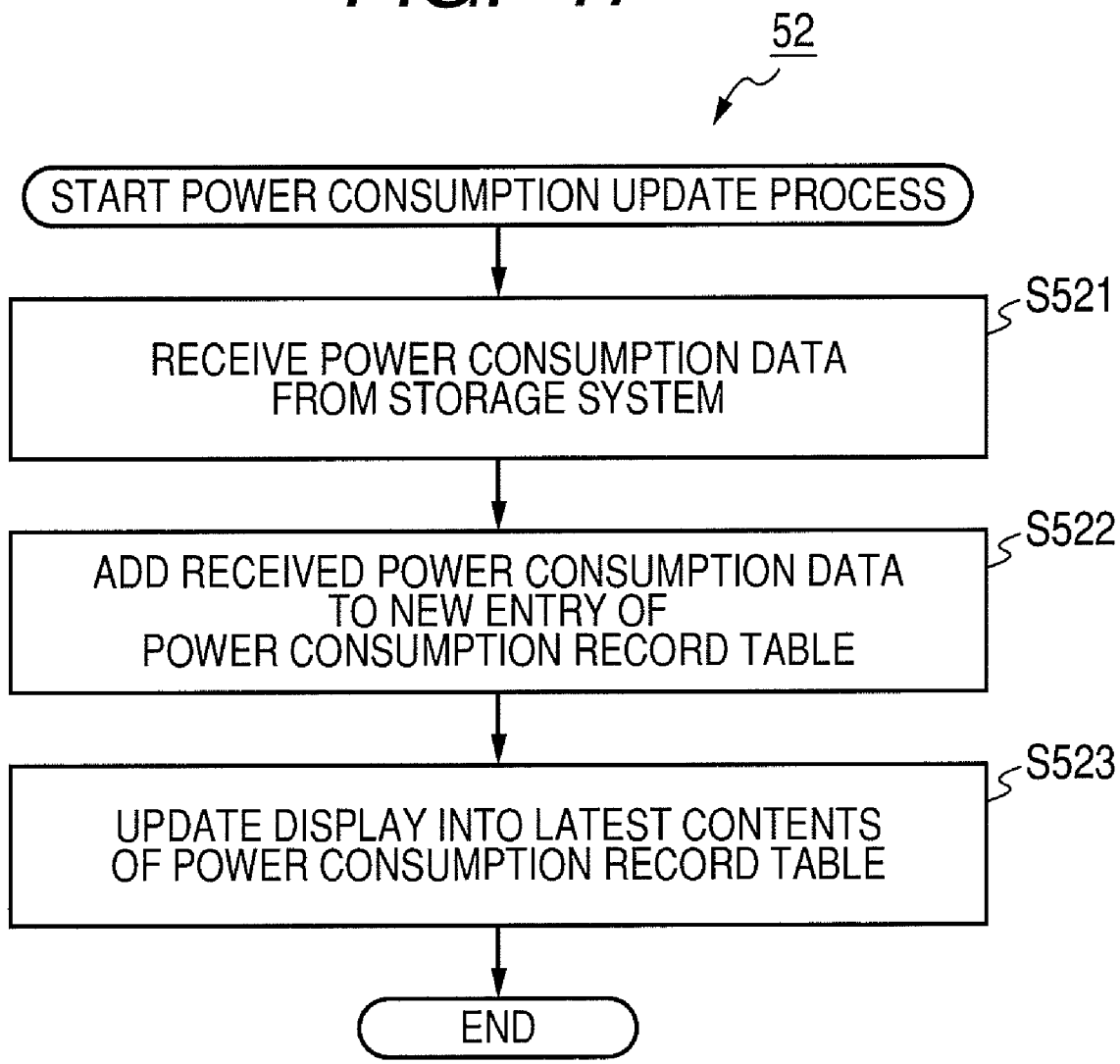
FIG. 17 is a flowchart illustrating a process example of a power consumption update function according to the first embodiment.

FIG. 17 is a diagram illustrating an example of the power consumption update function 52. The power consumption update function 52 is a function of receiving the latest data for the power consumption from the storage system 1 to store the data and update a display of the management terminal 4.

Hereinafter, a process of the power consumption update function 52 will be described in sequence.

In the power consumption update function 52, power consumption data is first received from the storage system 1 (S521). Subsequently, the power consumption update function 52 adds the received power consumption data to a new entry of the power consumption record table 51 (S522). Finally, the power consumption update function 52 updates a power consumption display screen of the management terminal 4 so as to include the latest information received from the storage system 1 (S523).

According to the storage system 1 according to the first embodiment of the invention, the power consumption of the hard disks 6 mounted in the storage system 1 can be calculated without using a power meter. Accordingly, it is possible to control power consumption with higher precision and a system manager can know information on the power consumption.

Second Embodiment

In a second embodiment, a method of setting values of the disk power specification table 32 in the first embodiment will be described. In this embodiment, a system manager or a maintenance man inputs the values through the management terminal 4 to set the values of the disk power specification table 32. Hereinafter, details will be described with reference the figures.

Figure 18:
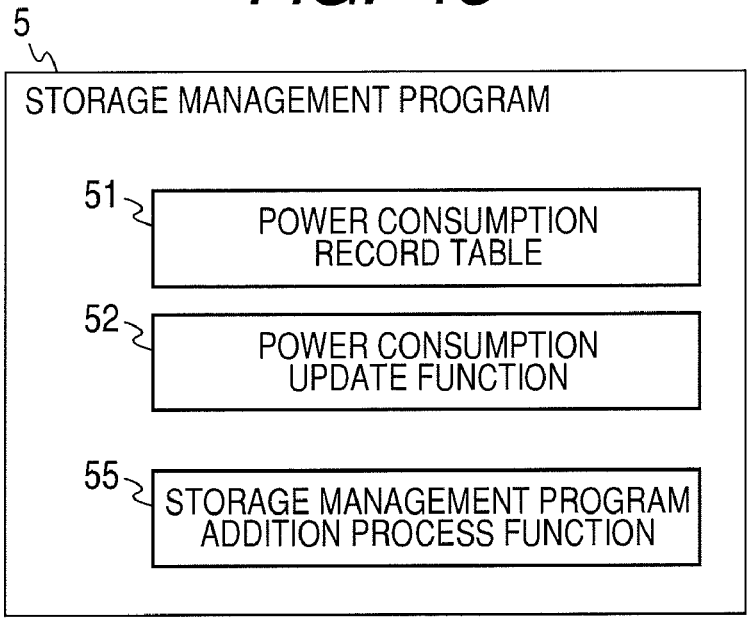
FIG. 18 is a diagram illustrating an example of the storage management program according to a second embodiment.

FIG. 18 is a diagram illustrating an example of the storage management program 5 executed in the management terminal 4. The storage management program 5 further includes a storage management program addition function 55 in addition to the functions described in the first embodiment.

Figure 19:
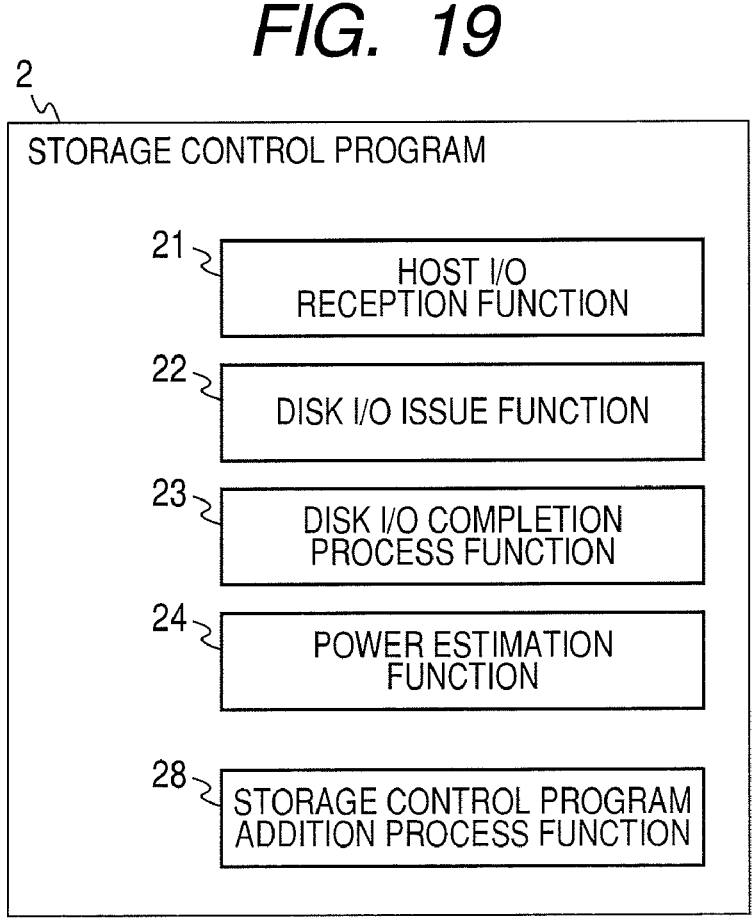
FIG. 19 is a diagram illustrating an example of a storage control program according to the second embodiment.

FIG. 19 is a diagram illustrating an example of the storage control program 2. The storage control program 2 further includes a storage control program addition function 28 in addition to the function described in the first embodiment.

Figure 20:
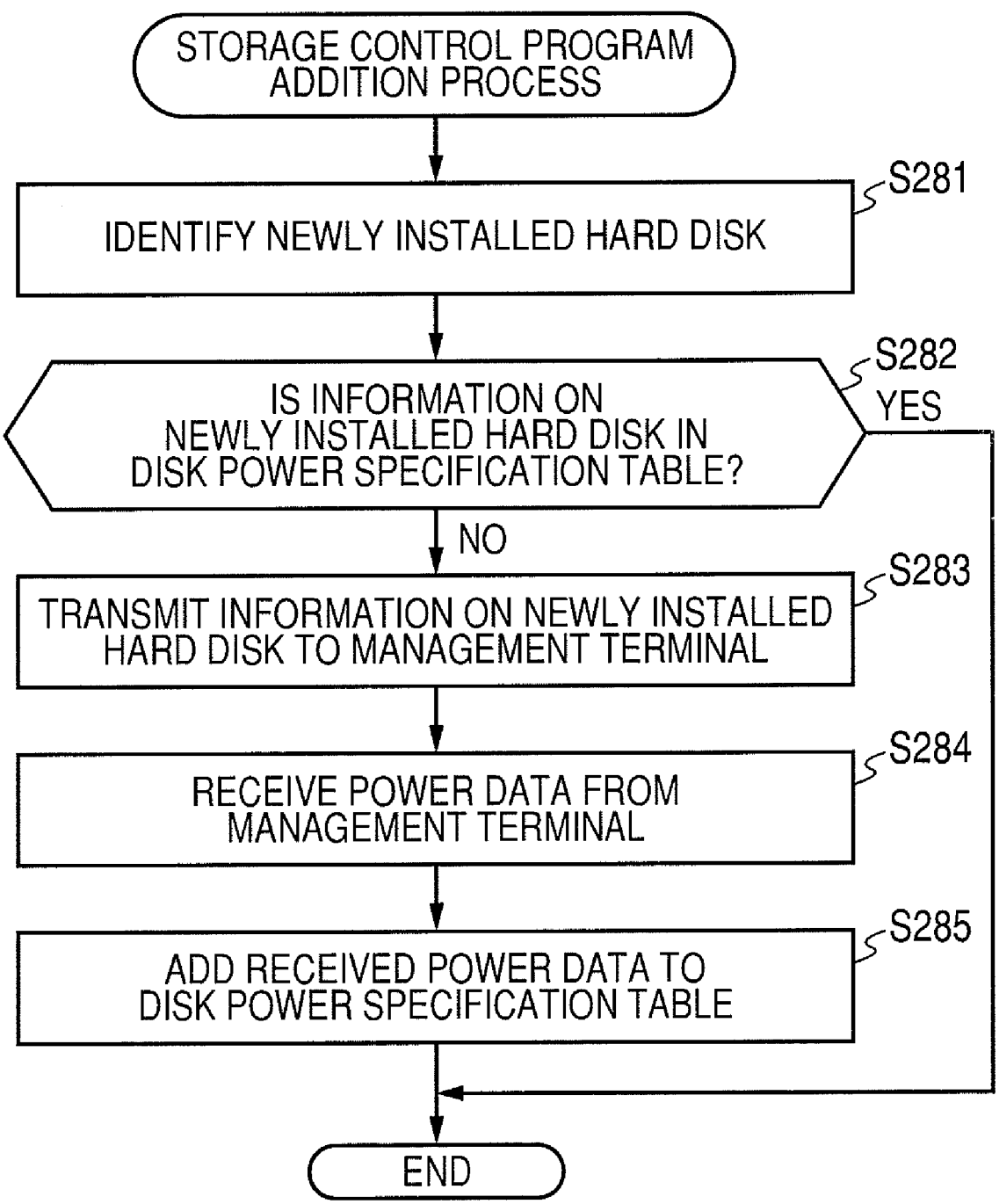
FIG. 20 is a flowchart illustrating an example of a storage control program addition function according to the second embodiment.

FIG. 20 is a diagram illustrating an example of the storage control program addition function 28. This function is called when a hard disk is added to the storage system. In addition, this function identifies the newly installed hard disk and obtains information on its power by transferring a type of the obtained hard disk to the management terminal 4.

Hereinafter, a process of the storage control program addition function 28 will be described in sequence.

First, the storage control program addition function 28 identifies the newly installed hard disk to obtain an identifier such as a model name (S281). As an identifying method, for example, a method of reading the model name which is stored in a non-volatile memory mounted in the hard disk can be used. It is inspected whether there is an entry that describes the information on the newly installed hard disk in the disk power specification table 32 (S282). When the information exists, the process just ends. Alternatively, when the information does not exist, the identifier of the newly installed hard disk is transferred to the management terminal 4 (S283). Subsequently, information of the power of the newly added hard disk is received from the management terminal 4 (S284). Finally, the received power information is added to the disk power specification table 32.

Figure 21:
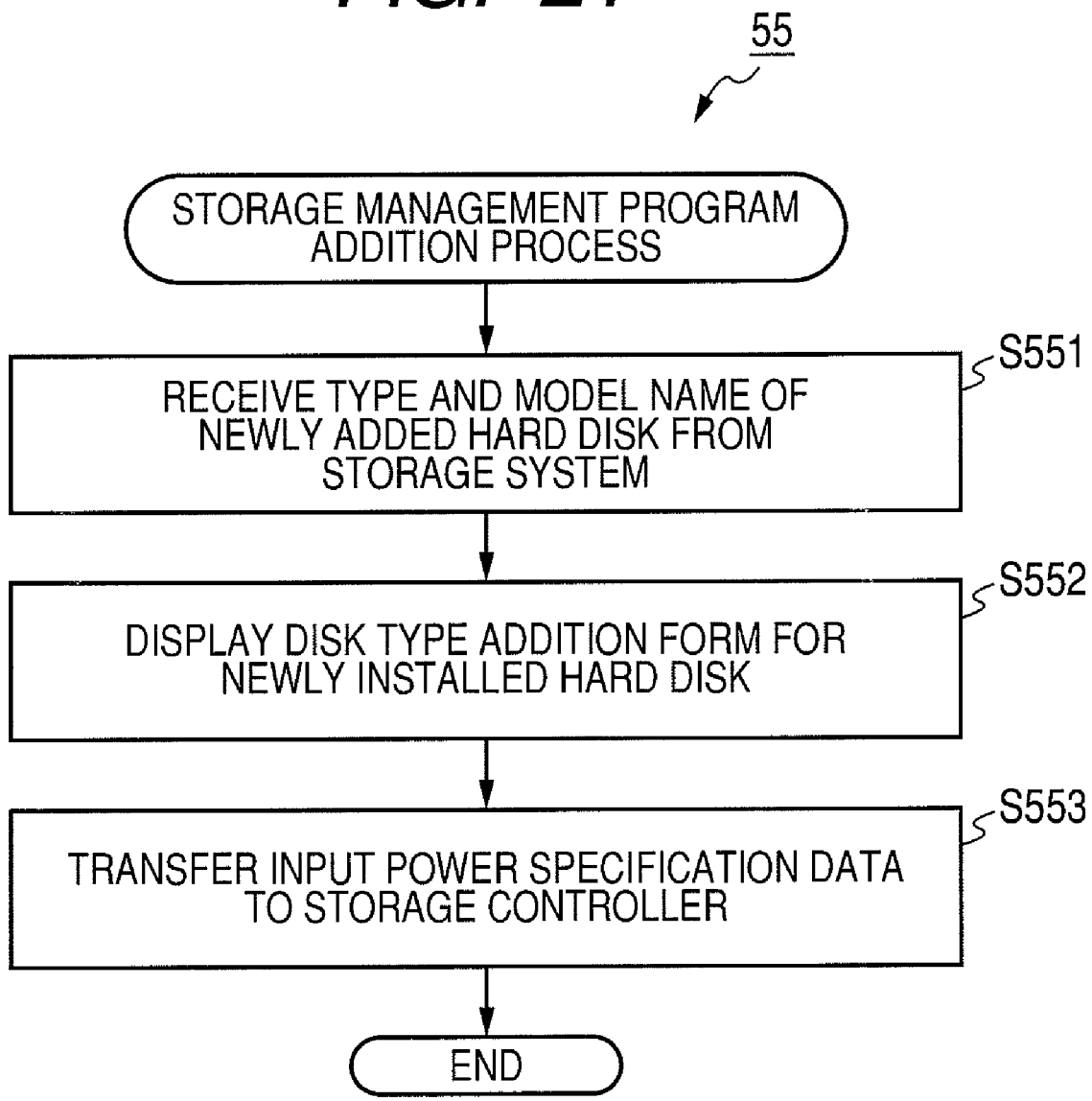
FIG. 21 is a flowchart illustrating an example of a storage management program addition function according to the second embodiment.

FIG. 21 is a diagram illustrating an example of the storage management program addition function 55. The storage management program addition function 55 is called by a request of the storage system 1 when a hard disk of which power consumption is not known is newly installed to the storage system 1, acquires power data when the system manager or the maintenance man inputs the information, and transfers the acquired power data to the storage system 1.

Hereinafter, a process of the storage management program addition function 55 will be described in sequence.

The storage management program addition function 55 first receives a model name of the newly installed hard disk from the storage system 1 (S551). Subsequently, the storage management program addition function 55 displays a disk type addition form 59 in accordance with a type of the newly installed hard disk (S552). Subsequently, the storage management program addition function 55 transfers the power data input through the disk type addition form 59 by the manager or the like to a storage controller (S553). Then, the process ends.

FIG. 22 is a diagram illustrating an example of the disk type addition form 59 displayed in step S552 of the storage management program addition function 55. A disk model name 593 indicates a model name of the newly installed hard disk. Hereinafter, each input parameter corresponds to each item of the disk power specification table 32. That is, the system manager inputs predetermined power values to a part or the whole of item columns of "an idle time power", "a random read time power increment", "a random write time power increment", "a sequential read time power increment", and "a sequential write time power increment" and presses "an add button", so that the power values of the newly installed hard disk are set in the disk power specification table 32.

As described above, the information on the newly installed hard disk of which the power is not known can be obtained. Accordingly, it is possible to perform the power estimation of the power including the information

Third Embodiment

A third embodiment describes an example in which when a hard disk embedded with the information on the power, which has been directly input by the system manager or the like in the second embodiment, is added in an operation place, a table is updated using the embedded data. Hereinafter, a difference from the second embodiment will be described with reference to the figures.

Figures 23, 24:
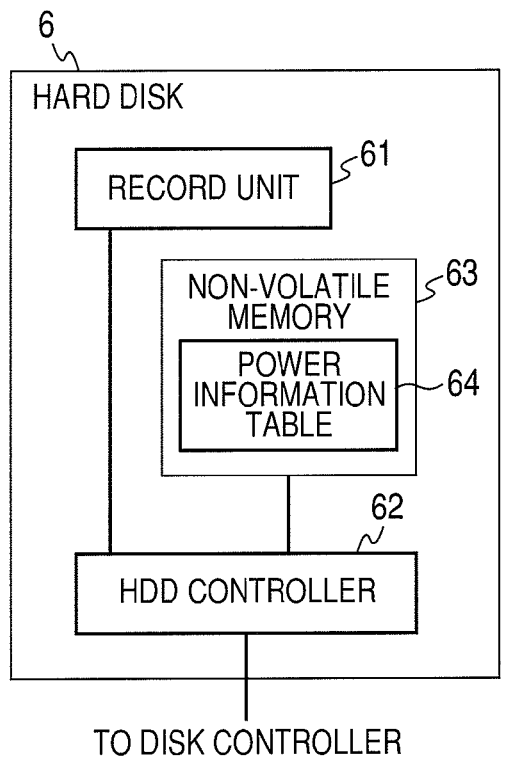
FIG. 23 is a diagram illustrating an example of a hard disk according to a third embodiment.
FIG. 24 is a diagram illustrating an example of a power information table according to the third embodiment.

FIG. 23 is a diagram illustrating a configuration of the hard disk 6. The hard disk 6 includes a record unit 61 which records data of a user, an HDD controller 62 which controls the record unit 61 and exchanges data and commands with the control unit 75 of the storage unit 1, and a non-volatile memory 63. The non-volatile memory 63 stores a power information table 64 which shows a power consumption specification of the hard disk 6.

FIG. 24 is a diagram illustrating an example of the power information table 64. In the power information table 64, a disk model name 641, an idle state power consumption 642, and power increments 643 to 646 of every type of access are recorded.

Figure 25:
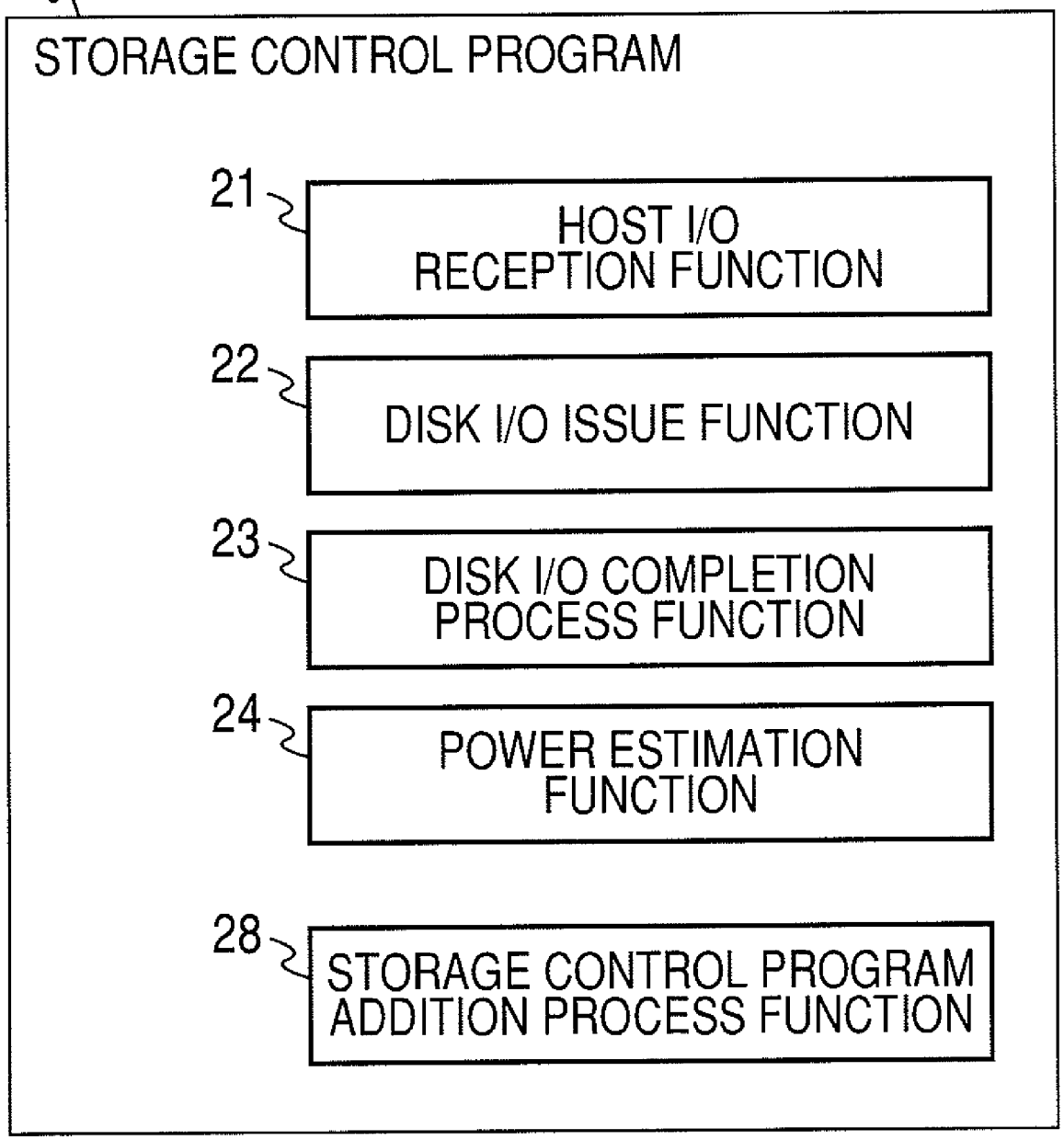
FIG. 25 is a diagram illustrating an example of a storage control program according to the third embodiment.

FIG. 25 is a diagram illustrating an example of a storage control program 2. The storage control program 2 further includes a storage control program addition function 28 in addition to the function in the first embodiment.

Figure 26:
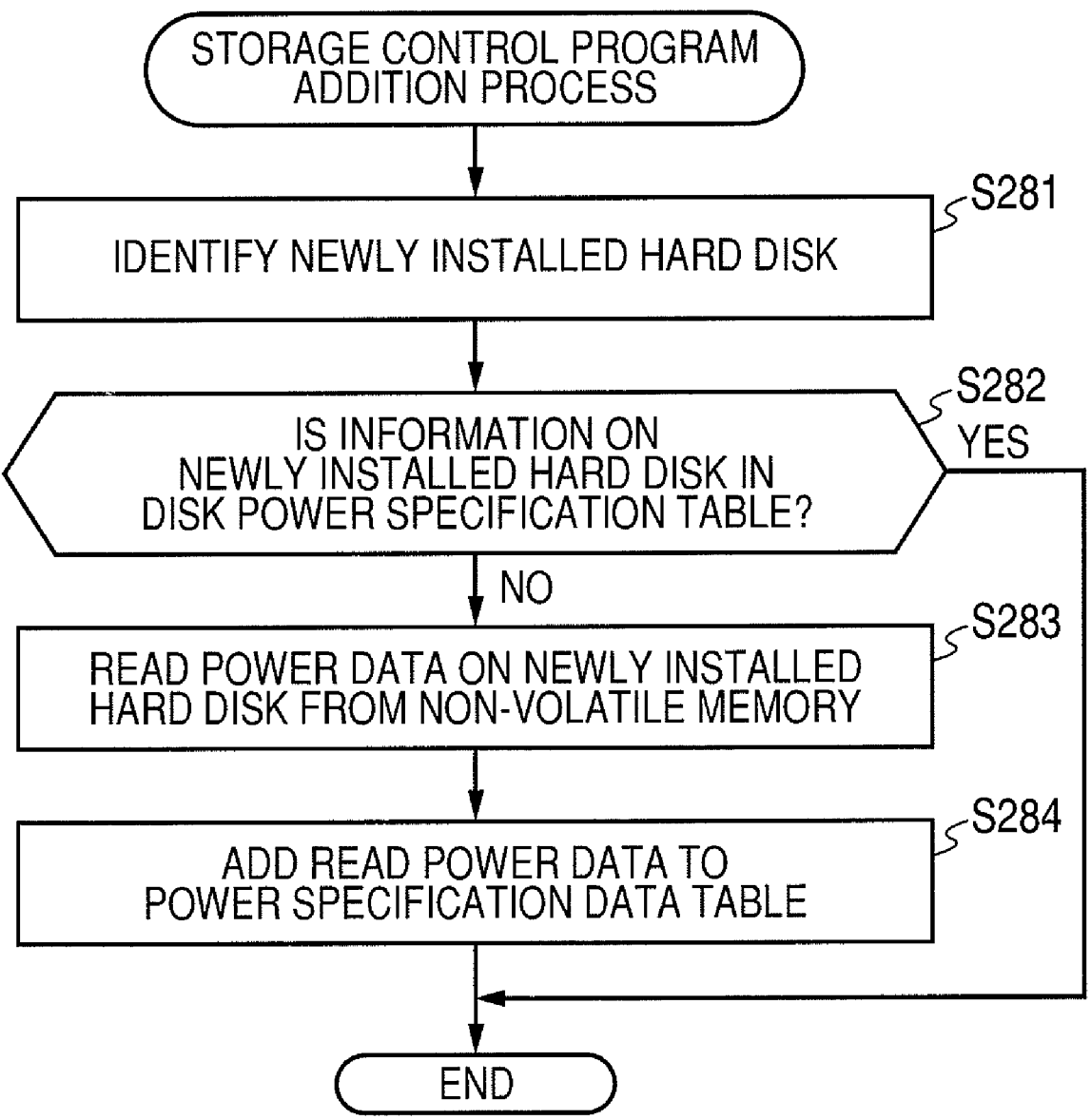
FIG. 26 is a flowchart illustrating an example of a storage control program addition function according to the third embodiment.

FIG. 26 is a diagram illustrating an example of the storage control program addition function 28. This function is called when a hard disk is newly installed. This function reads power information of the power information table 64 in the non-volatile memory 63, if necessary, and adds the information on the power to the disk power specification table 32.

Hereinafter, a process of this function will be described in sequence.

The storage control program addition function 28 first identifies the installed hard disk 6 and obtains an identifier such as a model name (S281). As an identifying method, for example, a method of reading the model name written in the non-volatile memory 63 mounted in the hard disk 6 can be used. The storage control program addition function 28 inspects whether the information on the newly installed hard disk 6 exists in the disk power specification table 32 (S282).

When the information exists, the storage control program addition function 28 just terminates the process.

Alternatively, when the information does not exist, the storage control program addition function 28 reads the power information table 64 of the newly installed hard disk 6 (S283). Finally, the storage control program addition function 28 adds the read data to the disk power specification table 32.

As described above, the power data of the newly installed hard disk is obtained even in a circumstance where it is difficult for a person to input the power data. Accordingly, it is possible to perform power estimation on the basis of the power data.

Fourth Embodiment

A fourth embodiment describes an example in which power data of a hard disk of which a power specification is not known is obtained using a power meter when the hard disk is newly installed. Hereinafter, a difference from the second embodiment will be described with reference to the figures.

Figure 27:
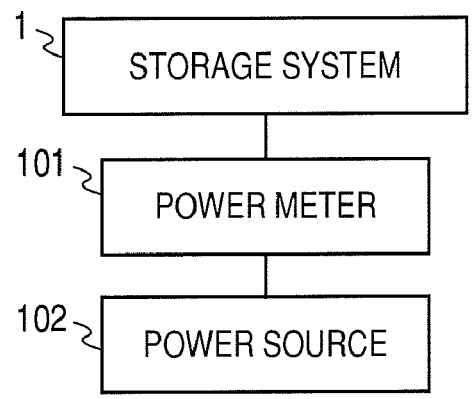
FIG. 27 is a diagram illustrating an example of a system according to a fourth embodiment.

FIG. 27 is a diagram illustrating a configuration of a system according to this embodiment. A power meter 101 is placed between the storage system 1 and a power source 102 and can measure power of the entire storage system 1. In addition, the power meter 101 may be present at the time of installing a new hard disk, but may be not placed in a normal operation.

Figure 28:
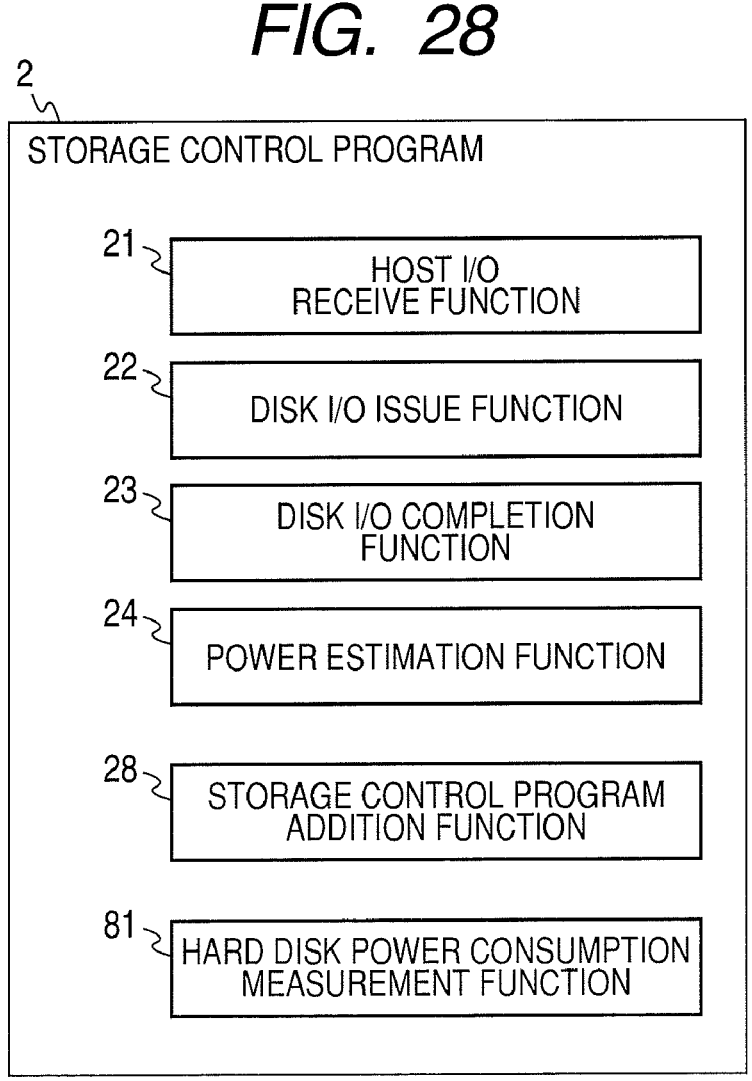
FIG. 28 is a diagram illustrating a storage control program according to the fourth embodiment.

FIG. 28 is a diagram illustrating an example of the storage control program 2. The storage control program 2 further includes a hard disk power consumption measurement function 81 in addition to the function described in the second embodiment.

Figure 29:
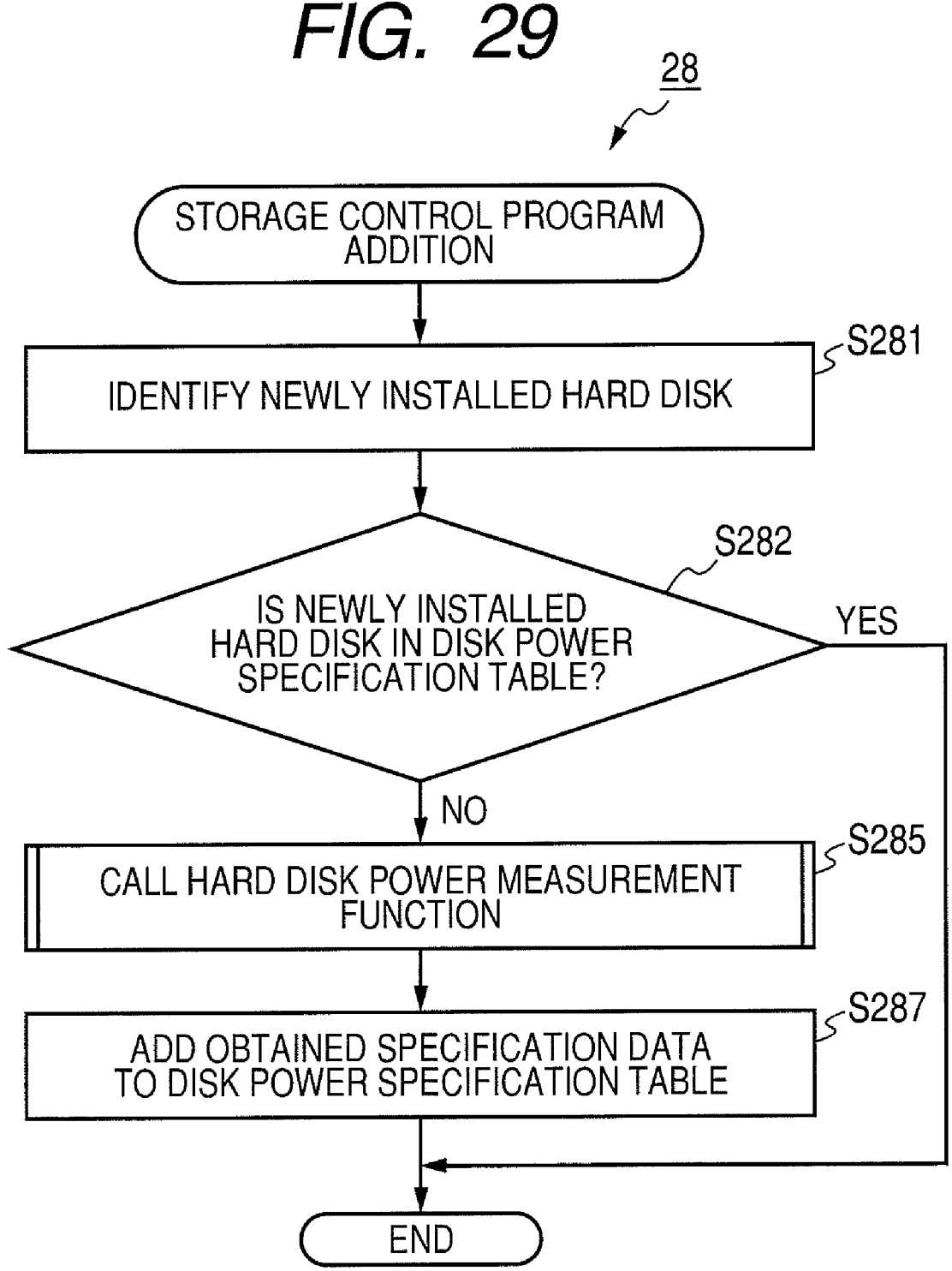
FIG. 29 is a flowchart illustrating an example of a storage control program addition function according to the fourth embodiment.

FIG. 29 is a diagram illustrating an example of a storage control program addition function 28. This function is called when a hard disk is newly installed. In addition, this function obtains a power specification of the newly added hard disk and adds the power specification to the disk power specification table 32.

Hereinafter, a process of this function will be described in sequence.

The storage control program addition function 28 first identifies the newly installed hard disk and obtains an identifier such as a model name (S281). As an identifying method, for example, a method of reading the model name present in the non-volatile memory 63 mounted in the hard disk can be used. The storage control program addition function 28 inspects whether information on the newly installed hard disk 6 exists in the disk power specification table 32 (S282).

When the information exists, the storage control program addition function 28 just terminates the process.

Alternatively, when the information does not exist, the storage control program addition function 28 calls a hard disk power measurement function 81 (S284).

The hard disk power measurement function 81 is a function of measuring various types of power of the newly installed hard disk 6. The details will be described below. The storage control program addition function 28 adds various power data of the newly installed hard disk 6 obtained by the measurement of the hard disk power consumption measurement function 81 to the disk power specification table 32 (S287). Then, the process ends.

Figure 30:
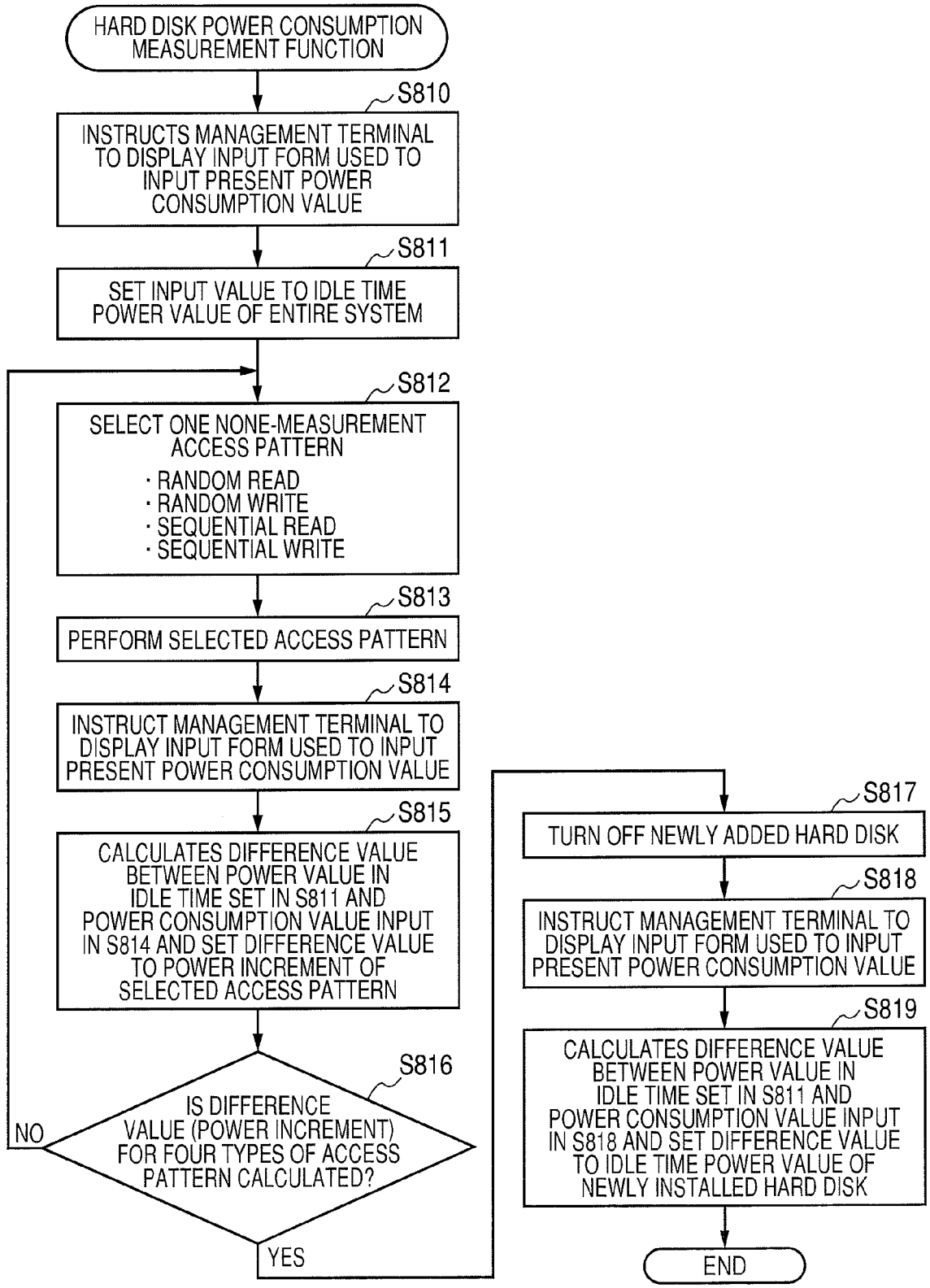
FIG. 30 is a flowchart illustrating an example of a hard disk power consumption measurement function according to the fourth embodiment.

FIG. 30 is a diagram illustrating a process example of the hard disk power consumption measurement function 81. This function is called by the storage control program addition function 28 when a hard disk 6 of which power consumption or the like is not known is newly installed. In addition, this function generates four types of access for the hard disk 6, measures power variation at the time of generating the accesses, and stores the power variation and power at the time of not generating the accesses as a power specification.

Hereinafter, a process of the storage control program addition function 28 will be described in sequence.

First, the hard disk power consumption measurement function 81 instructs the management terminal 4 to display on the monitor device an input screen used to input power consumption values of the present storage system 1 shown in the power meter 101 (S810) Subsequently, the hard disk power consumption measurement function 81 receives the power consumption values of the present storage system 1 input by the system manager or the like from the management terminal 4 and sets the power consumption values as an idle time power value of the entire storage system 1 (S811).

Subsequently, the hard disk power consumption measurement function 81 selects one access pattern, which has not yet been selected, from the four types of access of the random read, the random write, the sequential read, and the sequential write (S812).

Subsequently, the hard disk power consumption measurement function 81 sets the selected access pattern as the access pattern issued by the host computer and gains access to the newly added hard disk 6 (S813).

Subsequently, the hard disk power consumption measurement function 81 again instructs the management terminal 4 to display the input screen used to input the present power consumption values shown in the power meter 101 by the system manager or the like (S814). Subsequently, the hard disk power consumption measurement function 81 receives the power consumption value (the power consumption value of the storage system 1 which gains access to the newly added hard disk by the access pattern selected in step S812) of the present storage system 1 input through the input form of the management terminal 4 from the management terminal 4, and calculates a difference value between the received power consumption value and the idle time power value obtained in step S811 (S815). That is, the difference value is an increment value of the power consumption in a specific access pattern in the newly added hard disk 6.

Subsequently, the hard disk power consumption measurement function 81 determines whether the measuring on the four types of access is performed (S816). When there are more access patterns that is not measured, the hard disk power consumption measurement function 81 returns the process to step S812. Alternatively, when the four types of access have been measured, the hard disk power consumption measurement function 81 turns off the newly installed hard disk 6 (S817).

Subsequently, the hard disk power consumption measurement function 81 instructs the management terminal 4 to display an input screen used to input a power consumption value shown in the power meter 10 for the present storage system 1 in the state where the newly installed hard disk 6 is turned off (S818). Subsequently, the hard disk power consumption measurement function 81 receives the power consumption value of the present storage system 1 input by the system manager or the like through the management terminal 4 and calculates a difference value between the received power consumption value and the idle time power value obtained in step S811 (S819). That is, the difference value is an idle time power value of the newly added hard disk. Then, the hard disk power consumption measurement function 81 terminates the process.

Figure 31:
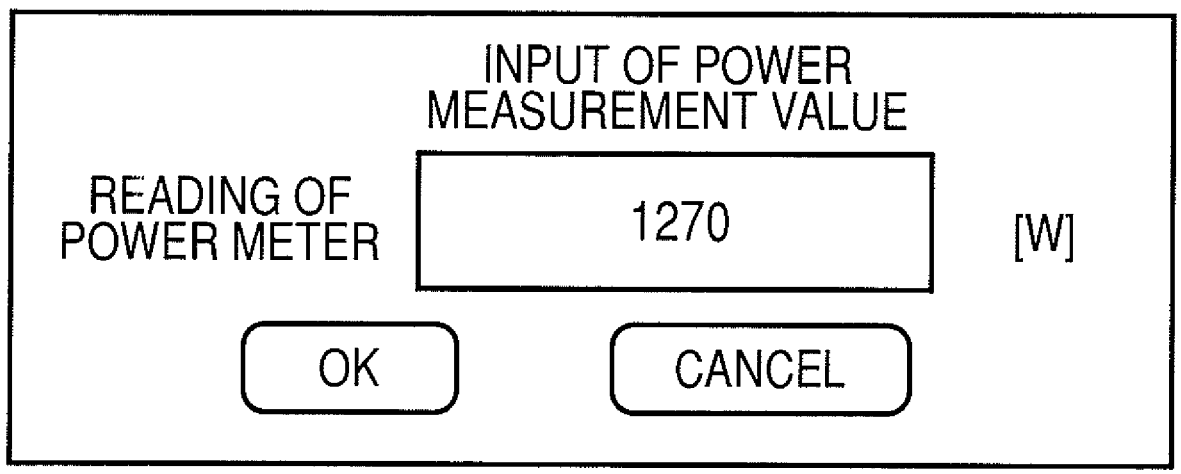
FIG. 31 is a diagram illustrating an example of a power input form according to the fourth embodiment.

FIG. 31 is a diagram illustrating a power input form of the management terminal. The system manger or the maintenance man inputs values which the present power meter reads through the power input form.

As described above, the power consumption specification can be simply obtained even in a case where the power specification of the newly installed hard disk is not known.

In this embodiment, the values of the present power meter reads are input by a person. However, when the power meter has a function of transferring measurement values to the management terminal, this way may be used. In addition, instead of turning off the newly added hard disk, the newly installed hard disk and the same type of hard disk may be added or removed.

What is claimed is:

1. A storage apparatus which includes one or more disk drives and performs an I/O process of data stored in the disk drives in accordance with an I/O process request from one or more host computers, comprising:
a control unit which calculates power consumption of the disk drives varying with the I/O process on the basis of power information necessary for the I/O process which is stored on the disk drives and an operation rate which is a ratio of time necessary for the I/O process per predetermined unit time; and
a display unit which displays the power consumption calculated by the control unit,
wherein the control unit measures an issuing time at which the control unit issues the I/O process to the disk drives and a receiving time at which the control unit receives response of the I/O process from the disk drives, and calculates a time necessary for the I/O process based on a difference between the issuing time and the receiving time,
wherein the I/O process includes several type of I/O processes including random read, random write, sequential read, and/or sequential write,
wherein the power information includes power information with respect to each type of I/O process, wherein the control unit distinguishes the type of I/O process, and measures the issuing time with respect to each type of I/O process, and the receiving time with respect to each type of the I/O process, and calculates the time necessary for the I/O process with respect to each type of the I/O process on the basis of the issuing time with respect to each type of I/O process, and the receiving time with respect to each type of the I/O process, and calculates an operation rate with respect to each type of the I/O process on the basis of the time necessary for the I/O process with respect to each type of the I/O process and a predetermined unit time, and calculates the power consumption with respect to each type of I/O process on the basis of the power information with respect to each type of I/O process, and the operation rate.

2. The storage apparatus according to claim 1, wherein the operation rate is a ratio of the unit time to a sum of time necessary for a plurality of the I/O processes performed during the unit time.

3. The storage apparatus according to claim 1, wherein the power information on the disk drives includes information on power increased by the I/O process.

4. The storage apparatus according to claim 1, further comprising an input interface which inputs the power information on the disk drives.

5. The storage apparatus according to claim 1,
wherein the disk drives includes a memory unit storing the power information on the disk drives, and
wherein the control unit acquires the power information on the disk drives from the memory unit.

6. The storage apparatus according to claim 1, further comprising:
an interface unit which inputs first power consumption information on the storage apparatus when another disk drives are added;
an interface unit which inputs second power consumption information on the storage apparatus when the I/O process is performed in the another disk drives; and
an interface unit which inputs third power consumption information on the storage apparatus when the another disk drives is turned off,
wherein the control unit calculates power consumption increment on the basis of the input first power consumption information and second power consumption information upon performing the I/O process of the another disk drives, calculates normal power consumption of the another disk drives on the basis of the input first power consumption information and second power consumption information, and acquires the calculated power consumption increment and the normal power consumption as the power information necessary for the I/O process.

7. A method of estimating power of a storage apparatus which includes one or more disk drives and performs an I/O process of data stored in the disk drives in accordance with an I/O process request from one or more host computers, the method comprising:
a first step of calculating power consumption of the disk drives in the I/O process on the basis of power information on the power consumption of the disk drives in the I/O process which is stored on the disk drives and an operation rate which is a ratio of time necessary for the I/O process per predetermined unit time; and
a second step of displaying the calculated power consumption on a display unit,
wherein in the first step the control unit measures an issuing at which the control unit issues I/O process to the disk drives and a receiving time at which the control unit receives a response of the I/O process from the disk drives, and calculates a time necessary for the I/O process based on a difference between the issuing time and the receiving time,
wherein the I/O process includes several type of I/O processes including random read, random write, sequential read, and/or sequential write,
wherein the power information includes power information with respect to each type of I/O process wherein the control unit distinguishes the type of I/O process, and
wherein in the first step the control unit measures the issuing time with respect to each type of I/O process, and the receiving time with respect to each type of the I/O process, and
calculates the time necessary for the I/O process with respect to each type of the I/O process on the basis of the issuing time with respect to each type of I/O process, and the receiving time with respect to each type of the I/O process, and
calculates the operation rate with respect to each type of the I/O process on the basis of the time necessary for the I/O process with respect to each type of the I/O process and a predetermined unit time, and
calculates the power consumption with respect to each type of I/O process on the basis of the power information with respect to each type of I/O process, and the operation rate.

8. The method according to claim 7, further comprising calculating the operation rate on the basis of the unit time and a sum of time necessary for a plurality of the I/O processes executed during the unit time.

9. The method according to claim 7, wherein the power information on the disk drives includes information on power increased by the I/O process.

10. The method according to claim 7, further comprising:
displaying an input interface which inputs the power information on the disk drives on the display unit; and
acquiring the power information on the disk drives from the input interface.

11. The method according to claim 7, further comprising acquiring the power information on the disk drives from a memory unit storing the power information on the disks device.

12. The method according to claim 7, further comprising:
displaying on the display unit an interface which inputs first power consumption information on the storage apparatus when another disk drives are added;
displaying on the display unit an interface which inputs second power consumption information on the storage apparatus when the I/O process is performed in the another disk drives;
displaying on the display unit an interface which inputs third power consumption information on the storage apparatus when the another disk drives are turned off;
acquiring the input first power consumption information and second power consumption information, and calculating power consumption increment on the basis of the input first power consumption information and second power consumption information upon performing the I/O process of the another disk drives; and
acquiring the input first power consumption information and second power consumption information, calculating normal power consumption of the another disk drives on the basis of the input first power consumption information and second power consumption information, and acquiring the calculated power consumption increment and the normal power consumption as the power information necessary for the I/O process.

* * * * *